US011809771B2

(12) United States Patent
Brockmann et al.

(10) Patent No.: US 11,809,771 B2
(45) Date of Patent: Nov. 7, 2023

(54) ORCHESTRATED CONTROL FOR DISPLAYING MEDIA

(71) Applicant: ACTIVEVIDEO NETWORKS, INC., San Jose, CA (US)

(72) Inventors: Ronald A. Brockmann, Los Gatos, CA (US); Maarten Hoeben, Acquapendente (IT)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

(21) Appl. No.: 17/864,333

(22) Filed: Jul. 13, 2022

(65) Prior Publication Data

US 2022/0350565 A1    Nov. 3, 2022

Related U.S. Application Data

(63) Continuation of application No. 16/890,957, filed on Jun. 2, 2020, now Pat. No. 11,416,203.

(Continued)

(51) Int. Cl.
*G06F 3/14* (2006.01)
*G06T 1/00* (2006.01)
(Continued)

(52) U.S. Cl.
CPC .......... *G06F 3/1462* (2013.01); *G06T 1/0085* (2013.01); *G06T 11/60* (2013.01); *H04L 67/75* (2022.05); *G06T 2200/16* (2013.01)

(58) Field of Classification Search
None
See application file for complete search history.

(56) References Cited

U.S. PATENT DOCUMENTS 5,592,622 A * 1/1997 Isfeld ..................... H04L 49/90
709/250
6,141,753 A * 10/2000 Zhao ..................... G06T 1/0021
713/168

(Continued)

FOREIGN PATENT DOCUMENTS

| EP | 2720435 A1 | 4/2014 |
| WO | WO2011/139155 A1 | 11/2011 |
| WO | WO2019/006185 A1 | 1/2019 |

OTHER PUBLICATIONS

ActiveVideo Networks, Inc., International Search Report and Written Opinion, PCT/US2018/040118, dated Oct. 26, 2018, 10 pgs.

(Continued)

*Primary Examiner* — Jason A Pringle-Parker
(74) *Attorney, Agent, or Firm* — Morgan, Lewis & Bockius LLP

(57) ABSTRACT

A computing device receives a modified first image frame from a client device, wherein the client device stores the first image frame. The computing device generates a second image frame that corresponds to the modified first image frame with a watermark. The computing device transmits, to a third-party application executing at the computing device, the second image frame and generates an instruction for modifying the first image frame, the instruction based on an altered version of the second image frame that is identified by the watermark, the second image frame altered by the third-party application. The computing device transmits, to the client device, the instruction for modifying the first image frame.

20 Claims, 13 Drawing Sheets

Related U.S. Application Data

(60) Provisional application No. 62/868,310, filed on Jun. 28, 2019.

(51) Int. Cl.
*G06T 11/60* (2006.01)
*H04L 67/75* (2022.01)

(56) References Cited

U.S. PATENT DOCUMENTS

| | | | |
|---|---|---|---|
| 7,058,815 B2 | 6/2006 | Morin | |
| 7,127,735 B1 | 10/2006 | Lee et al. | |
| 8,386,339 B2* | 2/2013 | Minnick | G06Q 30/0633 705/26.81 |
| 8,408,466 B2* | 4/2013 | Gratton | G06Q 30/0282 235/462.1 |
| 8,430,302 B2* | 4/2013 | Minnick | H04N 21/4348 725/135 |
| 8,443,407 B2* | 5/2013 | Gaede | H04N 21/436 725/38 |
| 9,167,281 B2 | 10/2015 | Petrov et al. | |
| 9,621,853 B1 | 4/2017 | Yang et al. | |
| 10,104,143 B1 | 10/2018 | Li et al. | |
| 2003/0072467 A1* | 4/2003 | Brundage | G06T 1/005 382/110 |
| 2004/0189677 A1* | 9/2004 | Amann | G09G 3/003 345/660 |
| 2005/0034152 A1 | 2/2005 | Matsumoto et al. | |
| 2006/0050973 A1 | 3/2006 | Ishikawa | |
| 2006/0122946 A1 | 6/2006 | Fahmy et al. | |
| 2008/0005676 A1 | 1/2008 | Evans et al. | |
| 2008/0267576 A1 | 10/2008 | Seo | |
| 2009/0169074 A1* | 7/2009 | Avinash | G16H 30/40 382/128 |
| 2010/0303146 A1 | 12/2010 | Kamay | |
| 2010/0325657 A1 | 12/2010 | Sellers et al. | |
| 2011/0022566 A1 | 1/2011 | Beaverson et al. | |
| 2011/0242133 A1* | 10/2011 | Greaves | G06F 16/44 345/633 |
| 2012/0188442 A1* | 7/2012 | Kennedy | G06T 1/0085 348/E7.003 |
| 2012/0198572 A1* | 8/2012 | Beals | H04N 21/6187 726/34 |
| 2013/0031222 A1 | 1/2013 | Molander | |
| 2013/0097426 A1* | 4/2013 | Agrawal | G06F 3/0484 713/176 |
| 2013/0204927 A1 | 8/2013 | Kruglikov et al. | |
| 2014/0068692 A1* | 3/2014 | Archibong | H04N 21/6334 725/116 |
| 2014/0098985 A1* | 4/2014 | Brubeck | G06T 1/0028 382/100 |
| 2014/0173695 A1* | 6/2014 | Valdivia | G06F 21/33 726/4 |
| 2014/0282773 A1 | 9/2014 | Hurst et al. | |
| 2015/0215358 A1 | 7/2015 | Wang et al. | |
| 2016/0182941 A1 | 6/2016 | Crabtree et al. | |
| 2016/0191627 A1 | 6/2016 | Huang et al. | |
| 2017/0054765 A1 | 2/2017 | Tucker et al. | |
| 2020/0409647 A1* | 12/2020 | Brockmann | H04L 65/612 |
| 2021/0099671 A1 | 4/2021 | Bakke | |

OTHER PUBLICATIONS

ActiveVideo Networks, Inc., International Preliminary Report on Patentability, PCT/US2018/040118, dated Dec. 31, 2019, 7 pgs.

ActiveVideo Networks, Inc., International Search Report and Written Opinion, PCT/US2020/36263, dated Sep. 28, 2020, 10 pgs.

ActiveVideo Networks, Inc., International Preliminary Report on Patentability, PCT/US2020/36263, dated Dec. 28, 2021, 7 pgs.

ActiveVideo Networks, Inc., Extended European Search Report, EP18822807.6, dated May 25, 2020, 9 pgs.

Brockmann, Office Action, U.S. Appl. No. 16/721,125, dated May 1, 2020, 13 pgs.

Brockmann, Final Office Action, U.S. Appl. No. 16/721,125, dated Oct. 8, 2020, 13 pgs.

Brockmann, Notice of Allowance, U.S. Appl. No. 16/721,125, dated May 18, 2021, 15 pgs.

Brockmann, Office Action, U.S. Appl. No. 16/890,957, dated Jan. 18, 2022, 13 pgs.

Brockmann, Notice of Allowance, U.S. Appl. No. 16/890,957, dated May 13, 2022, 7 pgs.

Brockmann, Office Action, U.S. Appl. No. 17/403,821, dated Aug. 16, 2022, 15 pgs.

Brockmann, Final Office Action, U.S. Appl. No. 17/403,821, dated Jan. 4, 2023, 15 pgs.

* cited by examiner

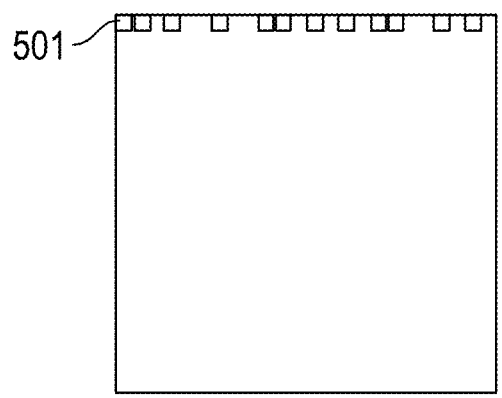
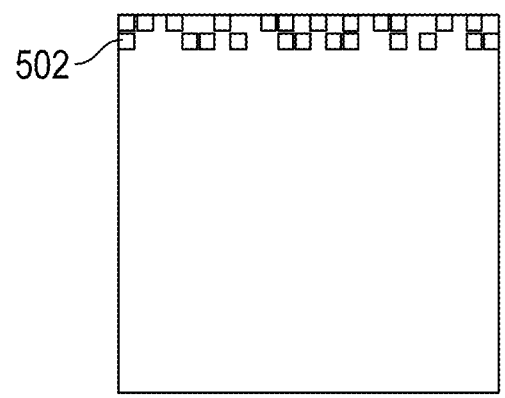
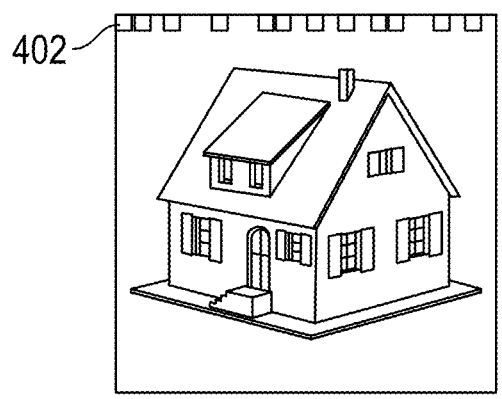
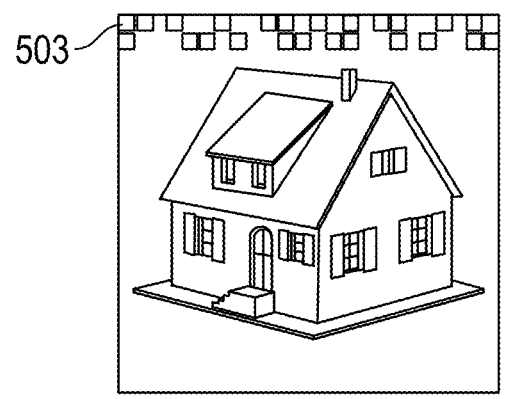
FIG. 5A FIG. 5B

ORCHESTRATED CONTROL FOR DISPLAYING MEDIA

RELATED APPLICATIONS

This application is a continuation of U.S. patent application Ser. No. 16/890,957, entitled "Orchestrated Control for Displaying Media," filed on Jun. 2, 2020, which claims priority to U.S. Provisional Application No. 62/868,310, entitled "Orchestrated Control for Displaying Media," filed on Jun. 28, 2019, each of which is hereby incorporated in their entirety.

FIELD OF ART

The present invention relates generally to controlling display of media by a client, and more particularly to controlling, by a server, media displayed by a client.

BACKGROUND

Application servers providing various remote applications to client devices have been in common use for several decades. Prior to the advent of broadband access to the Internet, these servers were primarily offered by cable television providers on a private network via the cable TV infrastructure. With the arrival of broadband content services, some application services are now hosted "in the cloud" on server systems providing service to client devices such as personal computer laptops, tablets and mobile phones.

Application servers execute an application on a server at a location that is remote from a client device and send the resulting output (e.g., a screen image, sequence of images, and/or a video stream) to the client device with which a user interacts. To the user, the application service appears to be running on the device in front of them while, in fact, the application service is being executed remotely.

These application server services have, to date, been reliant upon a one-to-one relationship with the client device and a remote server. Any combination of services has typically been managed by a process of merging services at the application server to which the client is connected.

SUMMARY

With the evolution of Internet-based media services, a need exists to allow client devices of almost any type, that are capable of displaying video images, to connect to multiple application servers and to access multiple applications.

To deliver the above, there is a need to simulate the functionality of specialized computer hardware, operating systems, proprietary content protection schemes, applications, and other computing resources on legacy devices or devices not designed to process tasks with the needed speed, computational capability, or required memory resources. To address this need, computer system emulators make available the functionality of advanced and often specialized computer platforms by duplicating their functionality on general purpose and often lower power computer platforms. Various components of computer systems under development can also be emulated to assess their behavior in a generic or less robust system or device environment.

This need to mimic (or virtualize) the functionality of certain computing resources in less robust environments, remains a constant issue. The terms "emulation," "virtualization," and "remoting" are used interchangeably herein.

One form of virtualization, sometimes referred to as "remote" virtualization, involves the interaction of two computing environments; one of which is a host server environment in which resides the actual computing resources to be virtualized, and the other in a remote guest or client device environment from which these resources are exploited. In this context, one can say that the "virtual" resources reside on the client device, while the actual resources reside in the host environment (although the host might also include additional virtual resources, such as virtual machines).

Commercially available remote desktop virtualization software enables users to remotely control applications running, by way of example, on their desktop computers at home or office from a client device, such as a smartphone or laptop, or from a remote location such as a hotel room. Such software enables such remote users to input events like keystrokes or screen touch events into a smartphone and see the results of such interactions on that device, while the applications being controlled are in fact executing on the host computer at the home or office. Thus, remote virtualization enables users to access, from a remote location, computing resources that, for a variety of reasons, are not otherwise available at the remote location. However, these solutions either require a high bandwidth and low latency connection between the server and client (such as is available on a Local Area Network or LAN), or do not support the more complex and immersive interactivity of modern media applications.

There is a need for systems that remotely manage content displayed on a client. However, obtaining client information for media delivery management is bandwidth consuming due to the size of graphical data.

Embodiments described herein are directed to improved systems and methods for updating a virtual client (e.g., in real-time) with a graphics state of a physical client without demanding a high level of bandwidth required to send media content from a physical client to a virtual client.

In accordance with some embodiments, a method performed at a client device for remotely processing a media asset is provided. The method comprises, at the client device, receiving a first image frame from a server and storing the first image frame. The method further comprises generating a first modified image that corresponds to the first image frame and transmitting, to a remote device, the generated first modified image. The method further comprises receiving, from the remote device, an instruction for displaying a second image frame. The remote device uses the first modified image to determine the instruction for displaying the second image frame. The method comprises, in response to receiving the instruction, displaying, on a display communicatively coupled to the client device, the second image frame.

In accordance with some embodiments, the method further includes receiving the second image frame from the remote device.

In some embodiments, the instruction for displaying the second image frame is an instruction for displaying an unmodified version of the first image frame. In some embodiments, the first modified image comprises a QR code corresponding to the first image frame. In some embodiments, the first modified image is not manipulated at the remote device. In some embodiments, the first modified image does not include image content for the image frame. In some embodiments, the received instruction includes the first modified image. In some embodiments, the instruction for displaying the second image frame is an instruction for displaying a modified version of the first image frame. In some embodiments, the first modified image comprises a first watermark overlaid with the first image frame. In some embodiments, generating the first modified image comprises converting at least a portion of the first image frame to an encoded data set. In some embodiments, the first modified image comprises a first perceptual hash of the first image frame. In some embodiments, the first modified image is manipulated at the remote device and the method further comprises receiving, from the remote device, the manipulated first modified image, wherein the second image frame is the manipulated first modified image. In some embodiments, the received instruction for displaying the second image frame includes the second image frame, and the second image frame a second watermark that is applied to the first modified image at the remote device.

In some embodiments, the method further comprises receiving a sequence of image frames that includes the first image frame and at least one additional frame from the server, the first image frame and the additional frame correspond to a cluster of images. storing the additional image frame third image frame, generating a second modified image that corresponds to the additional image frame, generating a sequence of modified images that includes the first modified image corresponding to the first image frame and the second modified image corresponding to the additional image frame, and transmitting, to the remote device, the sequence of modified images. The instruction for displaying the second image frame comprises an instruction for displaying the cluster of images.

In some embodiments, each modified image in the cluster of images includes a group identifier corresponding to the sequence of modified versions of the images. In some embodiments, the method further comprises transmitting, to the remote device, timing information for the sequence of modified versions of the images. In some embodiments, the first modified image comprises a QR code corresponding to the first image frame.

In some embodiments, the server comprises a content management device. In some embodiments, the client device is configured to utilize the processing resources of a server-based computing environment.

In accordance with some embodiments, a method performed at a virtual computing device for remotely processing a media stream is provided. The method comprises, at the virtual computing device, receiving, from a client device, a first image to which a first modification has been applied by the client that corresponds to a first image frame. The method includes generating a second image frame based on the received first image to which the first modification has been applied by the client, including removing the modification applied by the client from the received first image, after removing the modification applied by the client from the received first image, manipulating the received first image and after manipulating the received first image, applying a second modification to the first image to generate the second image frame. The method includes transmitting, to the client device, the second image frame for display at the client device.

In accordance with some embodiments, a method performed at a virtual computing device for remotely processing a media stream is provided. The method comprises, at the virtual computing device receiving, from a client device, a first image to which a first modification has been applied by the client that corresponds to a first image frame. The method includes generating an instruction for displaying a second image frame based on the received first image to which the first modification has been applied by the client, including removing the modification applied by the client from the received first image, after removing the modification applied by the client from the received first image, determining an instruction to manipulate the received first image, and after determining the instruction to manipulate the received first image, applying a second modification to the first image to generate a second image frame. The instruction for displaying the second image frame includes the second image frame. The method includes transmitting, to the client device, the instruction for displaying the second image frame at the client device.

In some embodiments, a non-transitory computer readable storage medium storing one or more programs for execution by one or more processors of an electronic device is provided. The one or more programs include instructions for performing any of the methods described above.

In some embodiments, an electronic device (e.g., a client device and/or a server system) is provided. The client device comprises one or more processors and memory storing one or more programs for execution by the one or more processors, the one or more programs including instructions for performing any of the methods described above.

It will be recognized that, in various embodiments, operations described with regard to the client may apply to a server and vice versa.

BRIEF DESCRIPTION OF THE DRAWINGS

FIGS. 5A-5B illustrate modifying an image with encoded data sets, in accordance with some embodiments.

DETAILED DESCRIPTION

Figure 1:
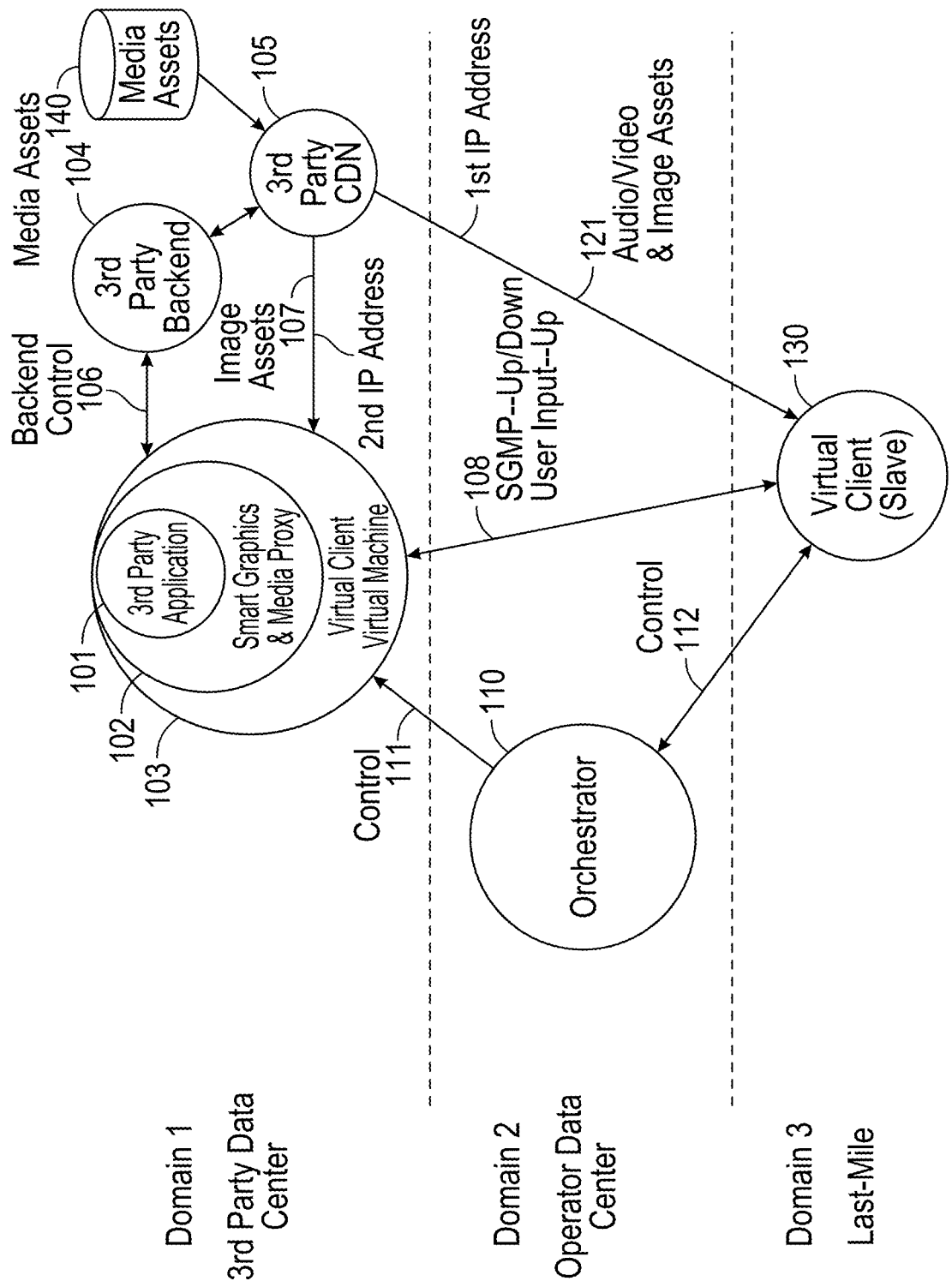
FIG. 1 is a top-level diagram illustrating a content delivery system, in accordance with some embodiments.

Various embodiments described herein enable users of a plurality of various client devices to interact with video and graphic-rich interactive applications running in a remote server environment. The resulting user experience is essentially equivalent to running these applications on the local client device, even when these devices require access to remote server resources such as various graphics rendering and other resources.

As the market for interactive and video services continues to grow on the Internet, some service providers require connectivity for a particular session to flow through a single IP address. There are many reasons for these changes and most revolve around the need for better security at the respective servers of the service providers.

Embodiments described herein describe techniques for enabling a virtual client virtual machine to manipulate images that are obtained by the VCVM from a client device after the client device obtains the images from a content server. Typically, the VCVM obtains images via a client device rather than obtaining images directly from the content server (e.g., because the content provider that operates the content server limits access to the content server such that only the client device is able to access data that is to be received by the client device). The client manipulates the images before providing the images to the VCVM to provide identifying information for the images (e.g., so that the client and the VCVM are able to refer to the image using the identifying information without needing to send a full image). An orchestrator accesses the VCVM and the controls at the client device such that the orchestrator can control and/or instruct the VCVM on arranging and manipulating the images to be displayed at the client device. The orchestrator controls, based on requests made at the client device, the arrangement of images from distinct content servers. The VCVM runs, for example, a plurality of third party applications associated with a plurality of content providers, and the orchestrator controls manipulation and display settings for a plurality of images from the plurality of content providers. For example, images from distinct content providers can be provided on a same display at the client device with the orchestrator arranging the display of the images.

For example, providing images from a client to an orchestrator enables the generation of an interactive video interface that displays a graphical representation of a rotating carousel to the user. Furthermore, the user could, for example, rotate the 'virtual' carousel using controls on a user input device (e.g., remote control) of the device that is executing the client application. As the user rotates the carousel, images of each movie poster appear on the surface of the carousel with the proper distortion of the image as it comes into view and sweeps around the perimeter of the carousel. For this effect to occur, the remote (master) application receives flat images of multiple (e.g., eight) movie posters and distorts each displayed image for it to appear with a perspective that conveys rotation of a virtual carousel as. In this example, the images are not sent as digests from the client to the server but include the content of the images. To enable the master application to manipulate the images and send the images to the client application, data containing image identification information is provided by the client application after one or more images is manipulated by the master application. For example, the client generates data to identify an image, then forwards the image (and the identification data) to the master application at the VCVM. The VCVM can manipulate the image, while maintaining the identification data, and send the manipulated image, with the identification data, back to the client device. The client device is enabled to identify the manipulated image based on the identification data, and display the manipulated image at the client device.

In some embodiments, the remote (master) application overlays a title, rating, or other information over a an image (such as a cover art image for media to be played back by the client device). The application upscales or downscales the image (for example, in lieu of OpenGL (e.g., because the scaling algorithms used by the application produce better results than OpenGL's scaling algorithms)). An example of this would be an application that downloads high resolution cover art and downscales the covers using a filter that is not available in OpenGL (e.g., Lanczos resampling) to display the cover art in a carousel.

FIG. 1 is a top-level diagram illustrating a content delivery system, in accordance with some embodiments. Components of the content delivery system operate within three domains. Domain 1 is associated with one or more third parties (e.g., one or more content providers) at a third party data center. In some embodiments, a third-party application 101 is deployed in a third-party data center (domain 1), provided by the third-party and connected 106 to a third-party application-specific backend 104. Third-party application-specific backend 104 performs operations associated with billing, user authentication, content access, and/or digital rights management. The third-party data center includes one or more servers that include the modules, networks, and storage elements described with regard to domain 1. In some embodiments, third party-application 101 is configured to generate a media stream by combining user interface graphics with media assets. In some embodiments, the application 101 executes within a virtual-client-virtual-machine 103 (VCVM) on an application server 700 (FIG. 7) of the third-party data center. In some embodiments, VCVM 103 includes a smart-graphics-&-media-proxy 102 (SGMP). In some embodiments, media assets 140 (e.g., images, audio, and/or video assets) are provided (e.g., via connection 107) to VCVM 103 by a media source (e.g., media stored on one or more servers that are separate from one or more servers on which application 101 executes) such as a third-party CDN server 105. Because third-party application 101 is configured to generate a media stream that includes user interface graphics and media content (e.g., video and/or image frames) received from one or more content sources, the system shown in FIG. 1 does not require an intermediary stitcher (e.g., such as a cable television system headend in domain 2) to mix graphics from an application 101 with video. In addition, in some embodiments, passing the video through the application's media playback stack is not required.

In some embodiments, the third party application 101 executed on VCVM 103 comprises an application associated with a media content provider. For example, a user of client device 130 (e.g., a thin client device) may request content from a first media content provider. As shown in FIG. 1, the first media provider associated with third-party CDN 105 sends (e.g., via connection 121) media assets to the client device. For example, CDN 105 sends one or more image frames and/or a video stream to client 130 (e.g., a virtual client (slave)). In some embodiments, the client 130 sends (e.g., using a graphics API such as OpenGL) a graphics state of the client device to the VCVM 103. The graphics state of the video stream includes, for example, pixel information (e.g., openGL from the client), timing information (e.g., based on latency between the CDN 10:5 and the client 130), playback information (e.g., based on user inputs/controls at the client) and/or a modified stream/image frame. In this way, the VCVM 103 is updated (e.g., in real-time and/or periodically) regarding the graphics state at the client 130 and can, in some embodiments, communicate the client's current graphics state to an orchestrator 110.

Domain 2 is associated with an operator data center. For example, the operator data center may be associated with a cable television system provider. In some embodiments, the operator data center is associated with a service provider distinct from the service provider(s) associated with the third party data center. In some embodiments, orchestrator 110, which is situated in the operator's network (domain 2), is configured to (1) manage client sessions, (2) control playback (e.g., start, end, pause, and/or resume) of media processed by application 101, (3) perform image handling (e.g., manipulate images and/or generate instructions for displaying image frames at the client device), (4) signal bandwidth settings to the SGMP 102, and/or (5) provide conditional access and digital rights management (DRM) related information to the SGMP 102. In some embodiments, the orchestrator 110 invokes an instance of VCVM 103 (e.g., in response to an input on a client device (e.g., thin client 130)). In some embodiments, the orchestrator 110 receives input, via connection 112, from a user of client device 130 corresponding to a control (e.g., a playback control) and forwards the control, via connection 111, to the VCVM. In some embodiments, the orchestrator processes the control and a command to the VCVM in order to control the graphics output by VCVM 103.

Domain 3 is associated with a "last-mile," referring to one or more client devices associated with one or more users. For example, the one or more client devices 130 include a STB (e.g., a STB that includes a graphical processing unit (GPU) or a legacy STB), an Internet set-top, a smart TV, a portable electronic device (e.g., tablet or a smartphone), and/or an internet of things (IOT) device. Because the third-party Application 101 is executed on an instance of a VCVM 103 in Domain 1, the computing power (e.g., CPU power) required of the client device is application-independent. Thus, the client device(s) may be thin-clients.

In some embodiments, the client device 130 does not run multiple applications, each application associated with a distinct content provider, in order to access media content from each of the content providers. For example, a single (e.g., generic) application (e.g., associated with the operator data center or another provider) runs on the client device and the client device communicates, via connection 108, the graphics state of the client device to the VCVM 103 such that the VCVM 103 can execute the processing of the media content (e.g., combining user interface graphics with video).

In some embodiments, image assets retrieved by the third-party application 101 from the third-party CDN 105 may follow an equivalent path, to the path for audio/video assets. In some embodiments, (e.g., as a matter of optimization and/or for those images for which the application or the SGMP requires image data), the application 101 receives the image assets directly from the CDN 105, as shown at 107 in FIG. 1. In some embodiments, the decision to have the client 130 get the image from the CDN 105 and pass back a digest to the application 101 or have the application 101 directly get the image from the CDN 105 is under the control of the SGMP 102. To the skilled reader, it may be clear that it is preferred to have the image asset available on the client 130 before the image is sent to application 101. In some embodiments, the image may first have to be forwarded from VCVM 130 to the client 130, or the client 130 gets the image from CDN 105 before the client can render it.

Figure 2:
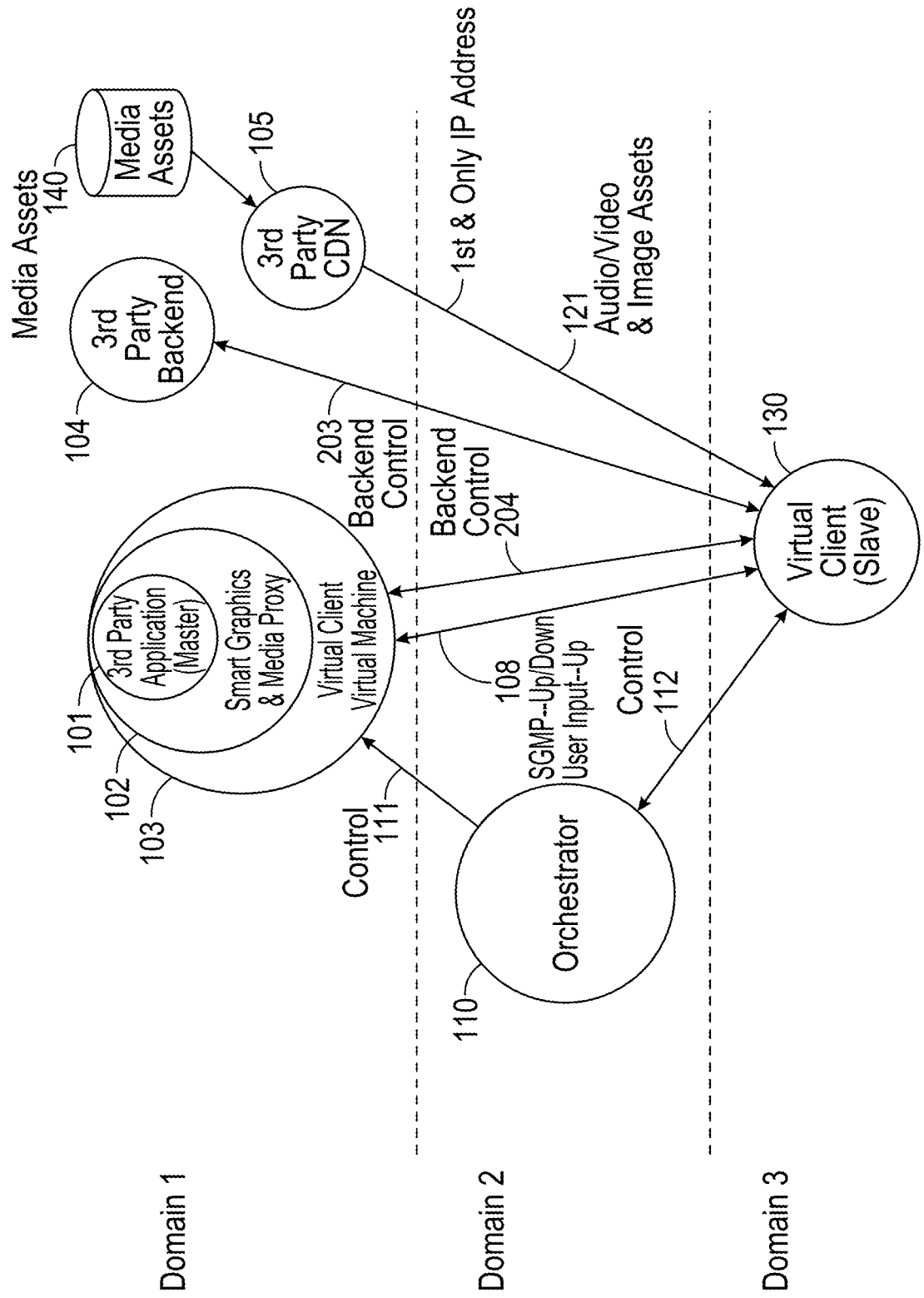
FIG. 2 is a top-level diagram illustrating a content-delivery system that supports third-party applications that require connectivity through a single IP address, in accordance with some embodiments.

FIG. 2 depicts a top-level diagram illustrating a content delivery system that supports third-party applications that require connectivity through a single IP address, in accordance with some embodiments. For example, third-party application(s) 101 (e.g., application server(s)) and associated third-party backend(s) 104 and CDN(s) 105 require session-related communication to come from a single network node (e.g., the client 130). This requirement may be enforced by the third-party for various reasons. For example, a service is a paid subscription service that allows only one session (e.g., running on one client) for said subscription to be active at a time. In this case, the client 130 uses an application proxy (e.g., application proxies 826, FIG. 8) in the client to function as a proxy for all network connectivity between the application 101, backend 104, and CDN 105. In some embodiments, backend control (e.g., user authentication via client 130 and/or rights management for content delivery) and CDN media assets 121 are routed through the client (whereas in other embodiments, media assets sent directly to the VCVM, shown in FIG. 1). For example, in FIG. 1, backend control 106 and/or a portion of the media assets (via connection 107) from CDN 105 are sent directly to the VCVM 103. For media assets 121 (e.g., audio/video and image assets), the client performs the same functions on behalf of the SGMP 102 as in the embodiment depicted by FIG. 1.

In some embodiments, media assets (e.g., image frames) are, under control of the SGMP, forwarded (e.g., unmodified) from the client 130 to application server 700. In some embodiments, data corresponding to media (e.g., a modified image frame) is transmitted from client 130 to application server 700 (e.g., as described with regard to FIG. 7). In some embodiments, backend control is routed to application server 700 through client 130 (e.g., unmodified), as indicated at 203 and 204.

In some embodiments, the systems described with regard to FIGS. 1 and 2 are configured to perform operations for controlling display, by client device 130, of images received from CDN 105, as described further below.

Image assets 140 typically arrive at an application's ingress point as encoded images (such as for example JPEG, PNG or WebP) via a network protocol (such as HTTPS), are decoded, operated upon (such as, for example, transformed/filtered for downscaling or image warping purposes) and arrive at an egress API (such as for example OpenGL) as raw texture material. A simple binary fingerprint will not survive these steps. Pairing encoded images to raw textures (where textures are the output of the master application after it has manipulated an image) is therefore not as trivial as following slice data through the application.

Pairing images at the master application's 101 ingress and egress points enables the client 130 to make a texture from an encoded image it already has (e.g., an image asset obtained from media assets 140) (e.g., instead of application 101 encoding the server-side texture as a new image, transmitting it to the client 130, and then instructing the client to make a texture from that new image). There are several advantages to not having to send the image back to the client, including saving on bandwidth, preventing image quality degradation due to lossy re-encoding images, preventing encoding/transmission latency that applications do not expect (e.g., transferring an image from CPU to GPU is normally a comparatively low overhead process), and decreasing server load because it does not have to encode the texture to an encoded image.

If the master (server) application 101 does not modify the image beyond what can be replicated by the client 130, such as for example an affine transformation or specific filters, the system's bandwidth profile can be further decreased by not forwarding the image data (pixels) from the client to the server, but instead just sending a modified version (e.g., a QR code) of the (encoded) image's salient properties from client to server. In this case, images seen at ingress can be related to texture seen at egress, and the operation can be applied client-side on the image to yield the same or equivalent texture material. Since the original image's pixel material is not required in this case, there is no need to forward the image from the client to the server.

However, if the master application 101 may modify or use the image's pixels in such a way that it cannot be replicated client-side, the server-side (master) application 101 receives with the original image, or at least a good enough substitute (such as a re-encoded image at, for example, a higher quantization level) and the application 101 encodes egress textures and sends them to the client 130 if the texture at egress cannot be related to the respective images on ingress.

In some embodiments, the client device 130 forwards a media asset (e.g., an image frame) to the VCVM 103. In some embodiments, the client device stores the media asset (e.g., in image storage module(s) 833, FIG. 8). In some embodiments, the client device 130 applies a modification (e.g., watermark) to the media asset and sends the modified media asset to the VCVM 103. In some embodiments, the client device stores the modified media asset. The VCVM 103 tracks the media assets and determines display instructions (e.g., based on user input 108).

The VCVM 103, running third-party application 101, generates a display instruction related to the media asset (e.g., an instruction to change a size of the media asset, an instruction to change a location of display of the media asset by client device 103, and instruction to apply a graphical user interface element to the media asset, etc. In some embodiments, the VCVM 103 transmits the generated display instruction to client device 130. In some embodiments, the VCVM 103 transmits the media asset (e.g., with the watermark applied) corresponding to the display instruction back to the client. The client device 130 receives the media asset and display instruction and applies the display instruction to the media asset. In some embodiments, the client device 130 displays the media asset (unmodified).

In some embodiments, the VCVM 103 manipulates (e.g., modifies) the media asset and sends the manipulated media asset to client device 130. In some embodiments, the client device 130 receives the manipulated media asset and/or the display instruction and applies the display instruction to the manipulated media asset. In some embodiments, the client device 130 displays the manipulated media asset in accordance with the display instruction.

In some embodiments, the client device 130 and/or the VCVM 103 executing on application server 700 determines whether an image asset will be manipulated at the VCVM 103. In some embodiments (e.g., based on the determination of whether the image asset will be manipulated at the VCVM 103), the client device 130 (or the VCVM 103) selects a type of modification to apply to the image asset. For example, (e.g., in accordance with a determination that the image asset will not be manipulated), the client device 130 stores the image asset and modifies the image asset (e.g., by removing image content and applying a QR code to a blank image frame) to identify the image. Any further instruction applied at the VCVM 103 is associated with the QR code. The VCVM 103 sends the instruction and the QR code back down to the client. The client device is enabled to identify (e.g., and retrieve) the stored image asset based on the QR code and applies the received instruction to the stored image asset. In some embodiments, the VCVM 103 does not manipulate the image asset and sends an instruction, to the client device, for the client device to manipulate the image asset. In some embodiments, no determination of whether an image asset will be manipulated at the VCVM 103 is performed. For example, the client device 130 applies a modification and sends the modified image asset (with image content) to the VCVM regardless of whether the image will then be manipulated at the VCVM.

In some embodiments, (e.g., in accordance with a determination that the image asset will be manipulated at the VCVM 103), the client device 130 applies a modification (e.g., a watermark that withstands manipulation of the image, such as a perceptual hash). The client device 130 stores the image asset (e.g., with the modification applied). The client device 130 sends the modified image asset to the VCVM 103. The VCVM 103 manipulates the modified image asset and generates a display instruction for the manipulated image asset. The VCVM 103. transmits the display instruction and the manipulated image asset to the client device. The client device identifies the stored image asset that corresponds to the received manipulated image (e.g., based on the applied watermark). The client device executes the received instruction for the manipulated image.

Figure 3:
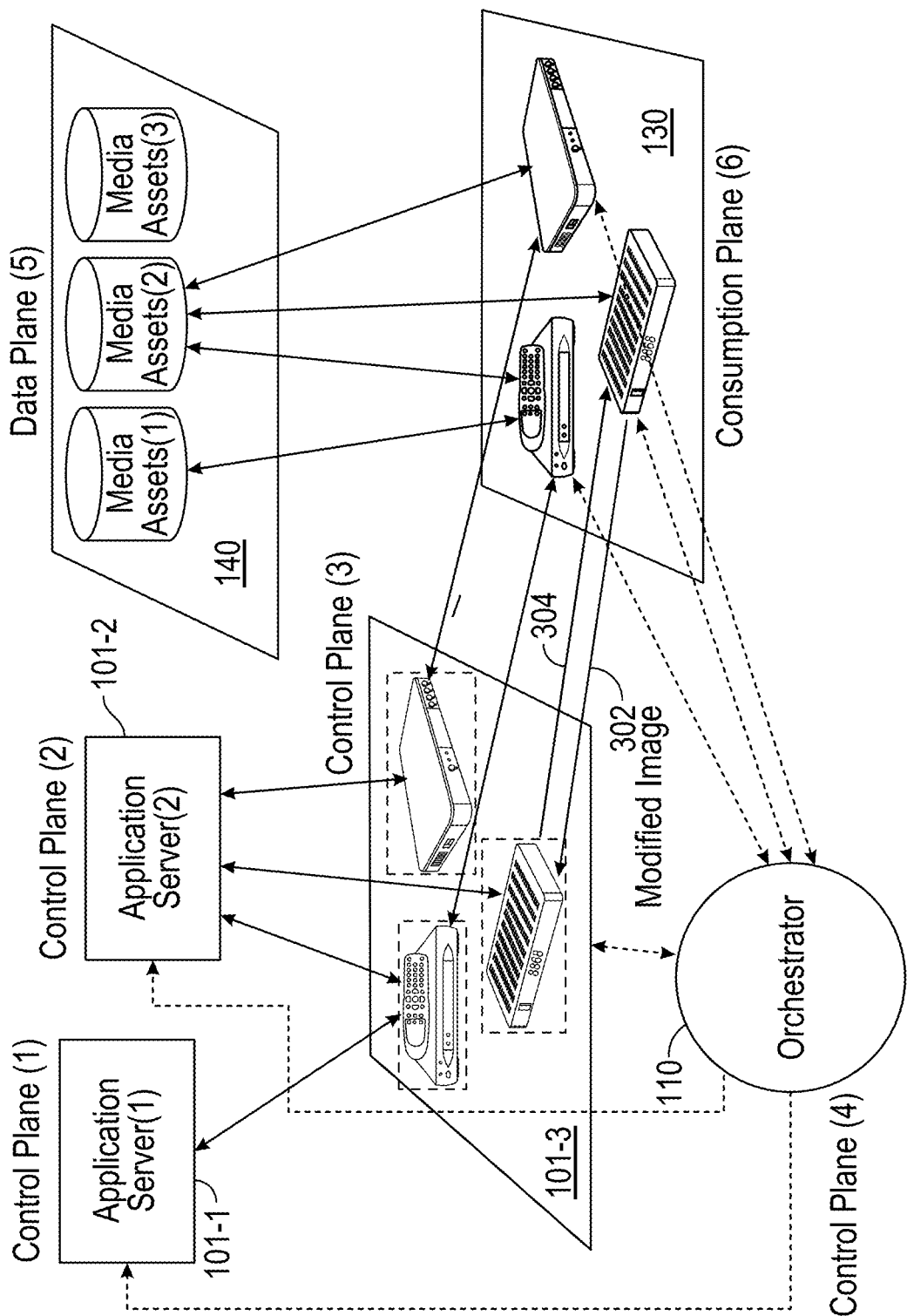
FIG. 3 is a top-level diagram illustrating modified images passing between the consumption plane and the control plane, in accordance with some embodiments.

FIG. 3 is a top-level diagram illustrating a content delivery system with a plurality of application servers. In some embodiments, a first program (e.g., third party application 101-3) running on a first machine (e.g., VCVM 103) interacts with certain internals of a second program (e.g., a client application) running on a second machine (e.g., client device 130). This process, referred to herein as "remoting," is the conveyance of the state of a first program using a graphics API (e.g., OpenGL) and/or a media playback API (e.g., OpenMAX) from a first application (e.g., application 101-3) running on a first machine (e.g., VCVM 103 or a server somewhere on the Internet (also known as running "in the cloud") to a second program on a second machine (e.g., a client)).

In some embodiments, the remoting system described herein realizes a beneficial separation of control information from data information between network domains. For example, control planes (1), (2), and (3) include instances of VCVMs. Each VCVM includes a third-party application 101-1, 102-2, and 101-3. In some embodiments, each instance of VCVM corresponds to a plurality of client devices. For example, a same VCVM can be running a third-party application 101-3 remotely on behalf of a plurality of client devices (e.g., set top boxes).

Control plane (4) includes orchestrator 110, as described with reference to FIG. 1. Information can further be exchanged between each of the control planes. It is to be understood that there can be additional control planes that run additional instances of VCVMs. Further, there is data exchanged between the control planes and the consumption plane (6), which represents the client-side plane. For example, modified image 302 and display instruction 304 are exchanged between consumption plane (6) and control plane (3). Further, consumption plane (6) receives media assets 140 from data plane (5), which includes the content (e.g., media assets (1), (2), and (3)) from content providers.

For example, third party application(s) 101-1, 101-2, and 101-3 are each associated with (e.g., running on) distinct application servers. As explained with reference to FIG. 2, media assets 140 (e.g., image frames) are provided to the application servers via client(s) 130. Client(s) 130, as shown in consumption plane (6), execute client application(s). For example, third party application 101-3 corresponds to a master application that controls the corresponding client application running on client 130. In some embodiments, each client 130 runs a distinct instance of the client application. In some embodiments, client(s) 130 are thin clients.

In some embodiments, after receiving media assets 140, client device 130 modifies the received media asset. For example, client device 130 applies a watermark to the image frame. The modified image 302 is then transmitted from the client 130 to a third party application 101-3 (e.g., a master application). As illustrated in FIGS. 1 and 2, third party application 101-3 runs on a VCVM 103. Third party application 101-3 determines an instruction related to the modified image 302 and transmits the instruction 304 to the client 130. The processing of the instruction is performed by master application 101-3 and the instruction 304 is forwarded to client 130.

Figure 4A:
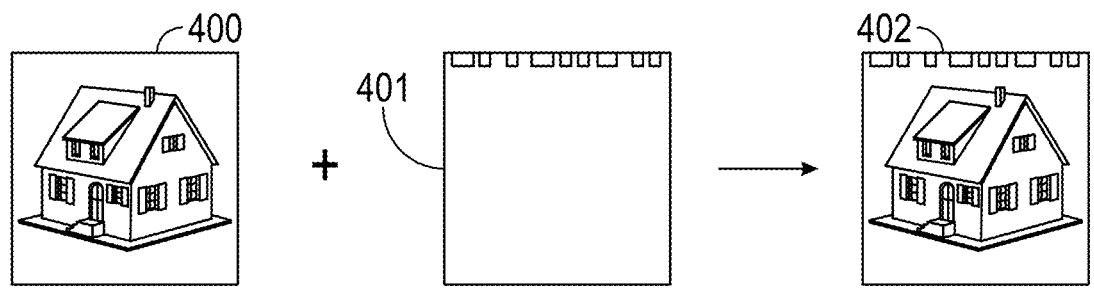
FIGS. 4A-4C illustrate modifying image frames with watermarks, in accordance with some embodiments.
Figure 4B:
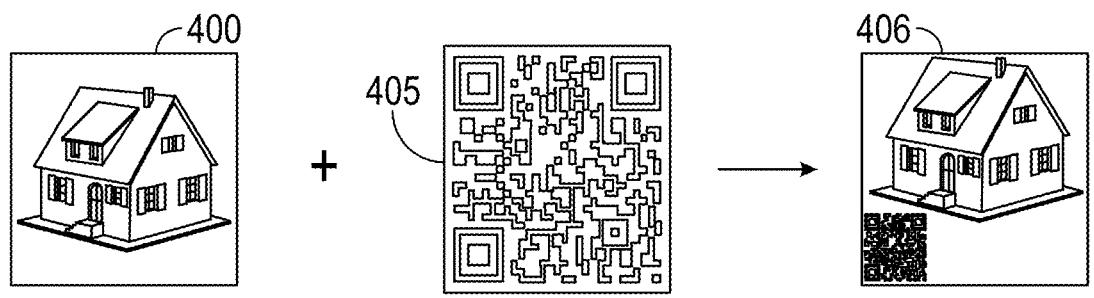
Figure 4C:
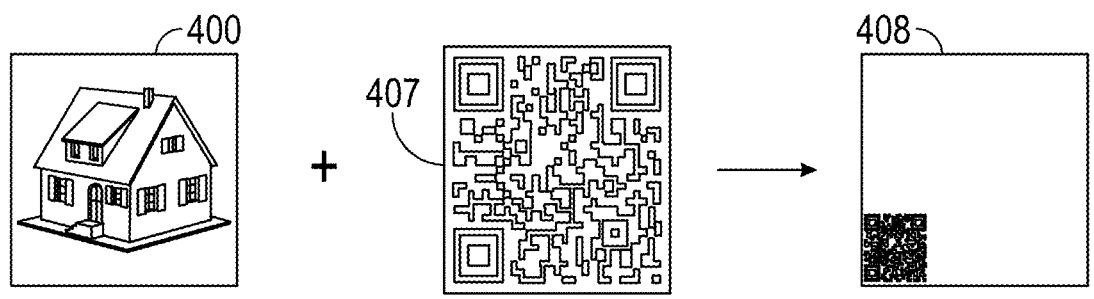

The client is enabled to retrieve an image frame (e.g., media assets 140) via a third-party CDN and to forward a modified image 302 corresponding to the retrieved image frame such that a remote server (e.g., third party application 101-3) is enabled to perform functions for (e.g., manipulate) the image frame, even though the image assets flow from the CDN directly to the client device 130 (e.g., due to a limitation for all connectivity related to assets from the third-party CDN to flow through a single IP address). The image assets flow from the CDN to the client device and not directly to the third party application such that the CDN only shares the image assets to a particular IP address (associated with the client device). The third party application manipulates the images (e.g., to resize and/or arrange the images for display) such that the system does not rely on processing power at the client device for manipulating the images. This improves the functioning of the client device as the processing is performed remotely (by the third party application). Reducing the requirement for processing power at the client device allows the services of third-party application 101 (e.g., generation of a media stream that includes user interface graphics, image content from a CDN and/or video content from a CDN) to be provided at a wide variety of client devices. For example, third-party application 101 generates instructions for displaying a modified version of an image from the CDN at the client (e.g., for a rotating carousel presentation as described above, to allow simultaneous presentation of user interface content from the third-party application and an image from the CDN, and/or for the purpose of controlling timing of displaying an image from the CDN at the client). Because the client obtains the images from the CDN, and the third party application manipulates the images to be displayed by the client device, there is a need for the client and the third party application to have a common system for identifying the images. FIGS. 4A-4C provide illustrative examples of modifications that client device 130 applies to image frames for the purpose of identifying the image frames.

As illustrated in FIGS. 4A-4C, in some embodiments, client device 130 modifies an image frame 400 (e.g., into modified image 302, FIG. 3) by applying a watermark to the image frame 400. For example, image frame 400 represents a media asset 140 received by the client device 130 from CDN 105. In some embodiments, as shown in FIG. 4A, an image modification 401 is applied to an image frame 400 to create modified image 402. For example, image modification 401 (e.g., the watermark) comprises an encoded binary row (or rows) of data that is imposed on the image (e.g., at the top 1 or 2 rows of the image). A more detailed illustration of the binary rows of data is shown in FIG. 5.

As shown in FIG. 4B, in some embodiments, the watermark comprises a QR code 405. The QR code is generated for an image frame (e.g., to identify the image frame) and is imbedded over image 400 to generate the modified image 406. In some embodiments, the QR code is imbedded to minimize the visibility of the QR code such that a user can still identify the content of the image frame.

As shown in FIG. 4C, in some embodiments, the watermark comprises a QR code 407 that is generated for the image frame and the QR code is imbedded in an image frame 408 that does not contain image content. For example, the QR code is imbedded in a blank image frame. In some embodiments, the blank image frame maintains the frame size of the unmodified image frame.

In some embodiments, the modified image frames 402, 406 and 408 maintain the frame size of the unmodified image frame (e.g., the image frame received from third party CDN 105).

In some embodiments, the client 130 transmits the image frame (e.g., unmodified) wrapped with a tag of the image frame (e.g., a hash value). In some embodiments, the modified image frame comprises the wrapped image and the tag. For example, the client 130 generates a hash of the image frame and wraps the hash with the unmodified image frame 400 to create the modified image frame that is transmitted to the server.

A special class of hash functions are perceptual hash (pHash) functions where image features are more important than the image's binary representation. In some embodiments, the wrapped image frame comprises a pHash of image frame and the image frame (e.g., as described with reference to FIG. 10). The purpose of a traditional hash function is to distinguish between data where even a single changed bit causes a different hash value (usually achieved through some avalanche effect), whereas a perceptual hash remains the same as long as the image's features remain the same (e.g., substantially irrespective of the image's size and transformation).

In some embodiments, the client 130 transmits, in addition to the modified image frame, additional information related to the image frame. For example, the client 130 transmits, to the server: an identifier that uniquely identifies the image frame at the client, a width and/or height of the image frame, bit-depth and/or data format (e.g., RGB, RGBA, greyscale, 8 bits, 16 bits, 5-6-5 bits, palettized, etc.) related to the image frame, a number of image frames (e.g., of a sequence of image frames), and/or timing information for the image frame.

In some embodiments, for the purpose of generating an image manipulation instruction, the server generates a new image with at least some of the properties (e.g., based on information forwarded from the client) as the image 400 received by the client. In some embodiments, the new image does not include the actual pixel data of image 400. In some embodiments, the new image does not include features of image 400 such as shown in manipulated image 408. For example, instead of the image's pixel data, a modification (e.g., a QR code) is applied to the image frame, where the modification contains the unique identifier (property number 1) from the modified image. The identifier can have any format, from, for example, a UUID to an identifier as simple as a single integer (e.g., a 32-bit unsigned integer) to identify assets. For example, the identifier is small enough to fit the simplest QR code. In some embodiments, the QR code is rendered in a fixed position (e.g., the lower left corner of the image frame) at such dimensions that its features survive the expected quantization and transformation operations (e.g., the QR bits are discernible).

In some embodiments, horizontally or vertically elongated shaped images spread the QR-code over a number of horizontal or vertical partitions which are rendered beside each other so that the QR-code can later be reconstructed into a square, instead of limiting the resolution to the smallest dimension. At the egress API, it is known that every texture must contain a QR code (if that does not hold, then the system is set up for the wrong scenario), the complete QR-code can be reconstructed from the texture, scanned and the client can be instructed to use the identified image as texture.

In some embodiments, a QR code may not fit because it requires at least 21 pixels horizontally and vertically, and the QR code is spread over partitions horizontally or vertically.

FIG. 5A illustrates an example of a single encoded row of data 501. For example, the encoded row of data is a single encoded row of data. In some embodiments, the single encoded row of data is imbedded in an image 400. For example, image 402 illustrates an image 400 that includes single encoded row of data 501. In some embodiments, a plurality of rows of data can be encoded, such as shown in FIG. 5B. In FIG. 5B, there are 2 rows of encoded data 502. In some embodiments, the plurality of rows of encoded data is imbedded in an image 400, to create image 503.

Figure 6:
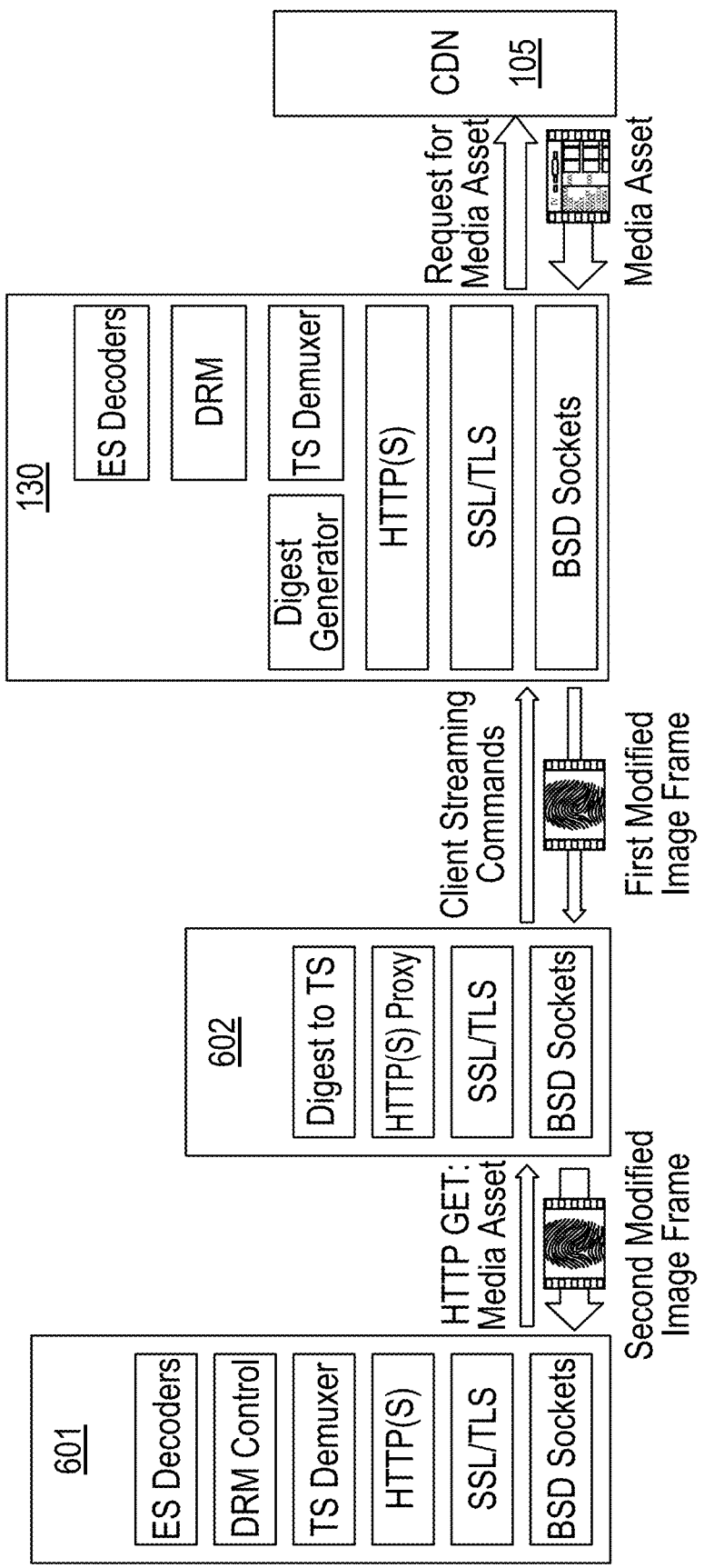
FIG. 6 is a block diagram of modules of a container, a platform and client device, in accordance with some embodiments.

FIG. 6 illustrates a network stack (e.g., protocol) implementation in accordance with some embodiments. For example, the virtual client virtual machine 103 includes a networking stack, including container 601 and platform 602, for communicating with client device 130.

In some embodiments, the client device 130 is coupled with CDN such that the client device receives media assets (e.g., a first image frame) from the CDN. In some embodiments, client device includes ES decoders for implementing a graphics API (e.g., Open GL ES 2), a DRM, a transport stream (TS) demuxer, a digest generator (e.g., to modify the image frame), HTTP(S) modules to enable communication and/or commands with HTTP(S) protocol, SSL/TLS for secured data transmissions (e.g., encryption) and BSD Sockets (or other API). In some embodiments, client device 130 requests media assets (e.g., an image frame) from CDN 105. In some embodiments, in response to the request transmitted from client device 130 requesting media assets, an image frame is received, at the client device 130, from CDN 105.

Platform 602 transmits the second modified image frame to the container 601 in response to the command issued by container 601. In some embodiments, platform 602 transmits an instruction corresponding to client streaming commands. In some embodiments, platform 602 determines the instruction corresponding to the client streaming commands and forwards the instruction to client 130. Platform 602 includes a digest to TS for changing the format of a modified image frame to TS, HTTP(S) proxy, SSL/TLS, and BSD sockets. Platform 602 receives a modified image frame from client 130. In some embodiments, the modified image frame is received via an HTTP PUT command. Container 601 also includes ES decoders, a DRM control, a TS demuxer, HTTP(S), SSL/TLS, and BSD sockets. The container 601 issues a command (e.g., an HTTP GET command) to retrieve a media asset from platform 602. In response to the command, the container 601 receives, from platform 602, a second modified image frame.

Figure 7:
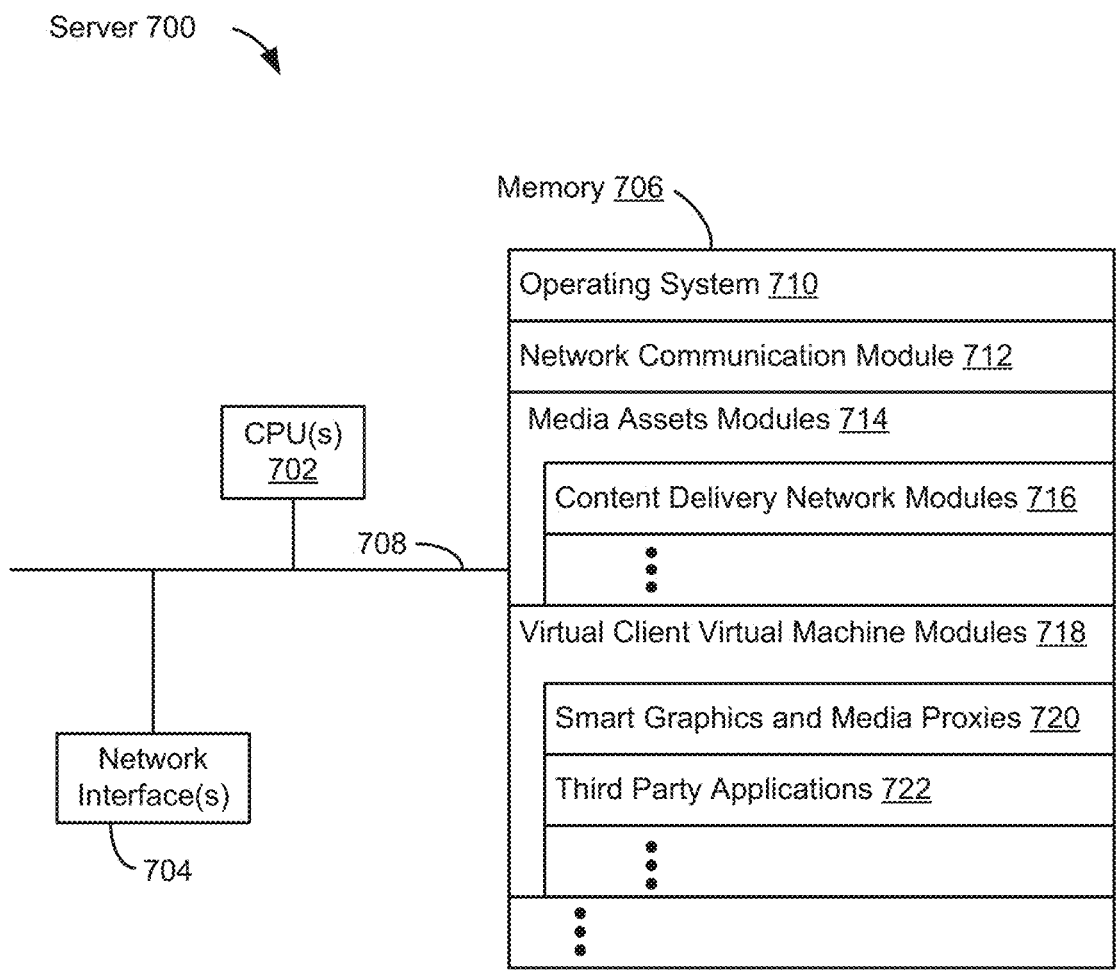
FIG. 7 is a block diagram of a server system, in accordance with some embodiments.

FIG. 7 is a block diagram illustrating an exemplary server computer system 700 in accordance with some implementations. In some embodiments, server computer system 700 is an application server that executes virtual client virtual machine 103. The server computer system 700 typically includes one or more central processing units/cores (CPUs) 702, one or more network interfaces 704, memory 706, and one or more communication buses 708 for interconnecting these components.

Memory 706 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 706, optionally, includes one or more storage devices remotely located from one or more CPUs 702. Memory 706, or, alternatively, the non-volatile solid-state memory device(s) within memory 706, includes a non-transitory computer-readable storage medium. In some implementations, memory 706, or the non-transitory computer-readable storage medium of memory 706, stores the following programs, modules and data structures, or a subset or superset thereof:

- an operating system 710 that includes procedures for handling various basic system services and for performing hardware dependent tasks;
- a network communication module 712 that is used for connecting the server computer system 700 to other computing devices via one or more network interfaces 704 (wired or wireless) connected to one or more networks such as the Internet, other WANs, LANs, PANs, MANs, VPNs, peer-to-peer networks, content delivery networks, ad-hoc connections, and so on;
- one or more media assets modules 714 for enabling the server computer system 700 to perform various functions, the media assets modules 714 including, but not limited to:
  - content delivery network modules 716 for retrieving and/or processing media content received, for example, from CDN 105
- one or more virtual client virtual machine modules 718 for executing one or more VCVM(s) 103; in some implementations, the one or more virtual client virtual machine modules 718 include:
  - smart graphics and media proxies 720 for tracking graphical states of client devices and/or processing graphics content (e.g., SGMP 720 includes SGMP 102 described above with reference of FIG. 1); and
  - third party applications 722 for execution on the VCVM(s) 103 (e.g., applications 722 include third-party applications 101 described above).

In some implementations, the server computer system 700 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 7 illustrates the server computer system 700 in accordance with some implementations, FIG. 7 is intended more as a functional description of the various features that may be present in one or more media content servers than as a structural schematic of the implementations described herein. In practice, items shown separately could be combined and some items could be separated. For example, some items shown separately in FIG. 7 could be implemented on single servers and single items could be implemented by one or more servers. The actual number of servers used to implement server computer system 700, and how features are allocated among them, will vary from one implementation to another and, optionally, depends in part on the amount of data traffic that the server system handles during peak usage periods as well as during average usage periods.

Figure 8:
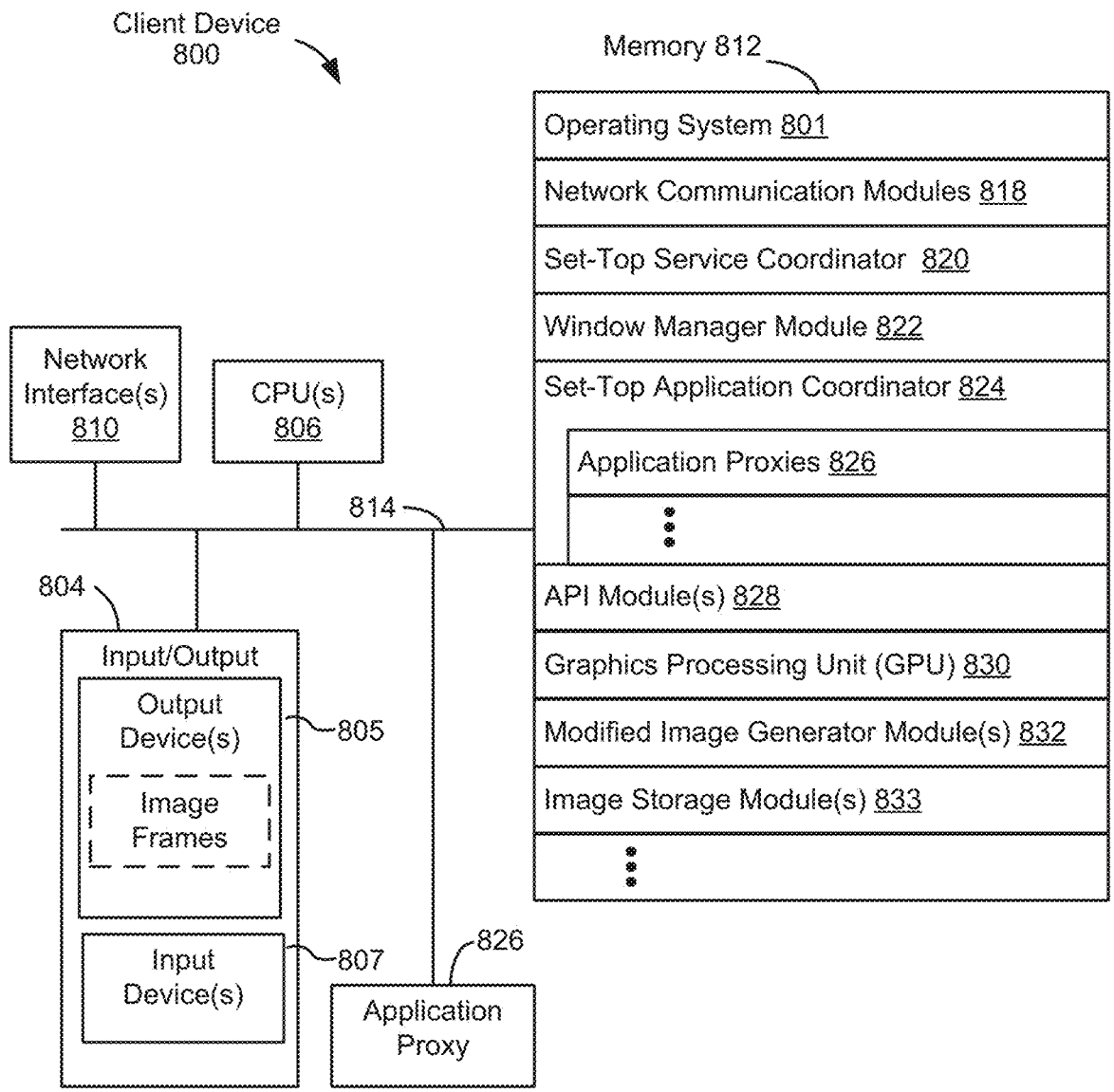
FIG. 8 is a block diagram of a client device, in accordance with some embodiments.

FIG. 8 is a block diagram illustrating an exemplary client device 800 (e.g., client device 130 of FIG. 1) in accordance with some implementations. The client device 800 typically includes one or more central processing units (CPU(s), e.g., processors or cores) 806, one or more network (or other communications) interfaces 810, memory 812, and one or more communication buses 814 for interconnecting these components. The communication buses 814 optionally include circuitry (sometimes called a chipset) that interconnects and controls communications between system components.

In some embodiments, the client device is coupled to output device(s) 805, for image output (e.g., image frames), video output, audio output, and input device(s) 807. In some implementations, the input devices 807 include a keyboard, a remote controller, or a track pad. Alternatively, or in addition, the client device includes (e.g., is coupled to) a display device.

In some implementations, the one or more network interfaces 810 include wireless and/or wired interfaces for receiving data from and/or transmitting data to other client devices 800, a server computer system 700, and/or other devices or systems. In some implementations, data communications are carried out using any of a variety of custom or standard wired protocols (e.g., USB, Firewire, Ethernet, etc.).

Memory 812 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 812 may optionally include one or more storage devices remotely located from the CPU(s) 806. Memory 812, or alternately, the non-volatile memory solid-state storage devices within memory 812, includes a non-transitory computer-readable storage medium. In some implementations, memory 812 or the non-transitory computer-readable storage medium of memory 812 stores the following programs, modules, and data structures, or a subset or superset thereof:
- an operating system 801 that includes procedures for handling various basic system services and for performing hardware dependent tasks;
- network communication module(s) 818 for connecting the client device 800 to other computing devices (e.g., client devices 103, server computer system 700, and/or other devices) via the one or more network interface(s) 810 (wired or wireless);
- a set-top service coordinator 820 for assigning a set-top-application proxy to communicate with various VCVMs;
- a window manager module 822 for integrating two distinct applications within a display;
- a set-top application coordinator 824 for receiving control instructions and managing one or more application proxy instances, the set-top application coordinator having additional module(s), including but not limited to:
  - one or more application proxies 826 for communicating (e.g., graphical states) with third-party applications (e.g., application 101);
- API Module(s) 828 for managing a variety of APIs, including, for example, OpenGL and/or OpenMAX;
- Graphics Processing Unit (GPU) 830 for rendering graphical content, including frame buffering and display control;
- a modified image generator module(s) 832 for generating modified image frames in accordance with some implementations;
- an image storage module(s) 833 for storing original media content (e.g., from CDN 105), such as storing an original image frame;
- input/output module 804, including output device 805 for outputting video and/or audio content (e.g., to be reproduced by one or more displays and/or loudspeakers coupled with client device 800) and/or input device 807 for receiving user input (e.g., from a component of client device 800 (e.g., keyboard, mouse, and/or touchscreen) and/or a control coupled to client device 800 (e.g., a remote control)).

Figure 9A:
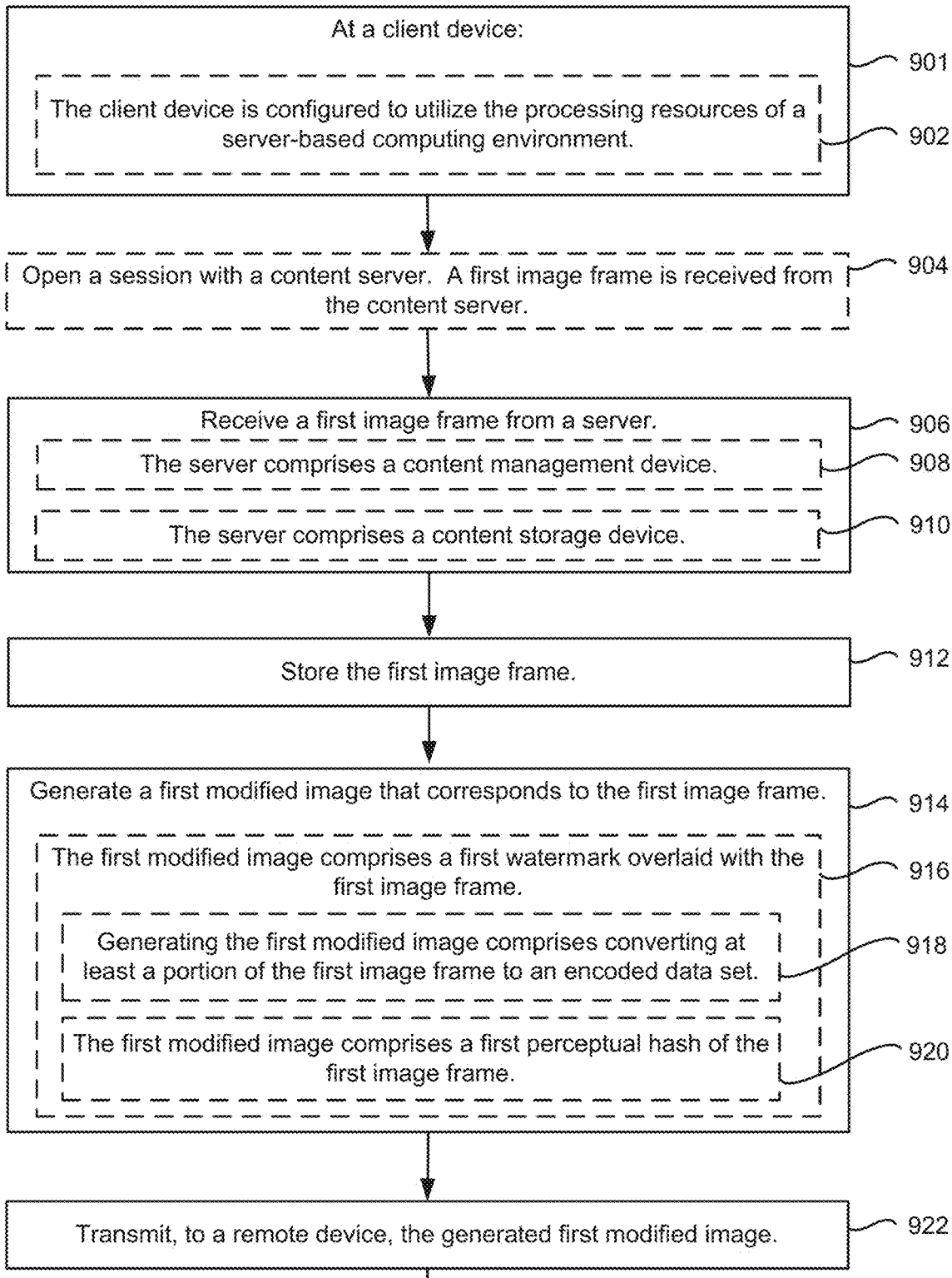
FIGS. 9A-9C are flowcharts describing a method performed by a client device, in accordance with some embodiments.
Figure 9B:
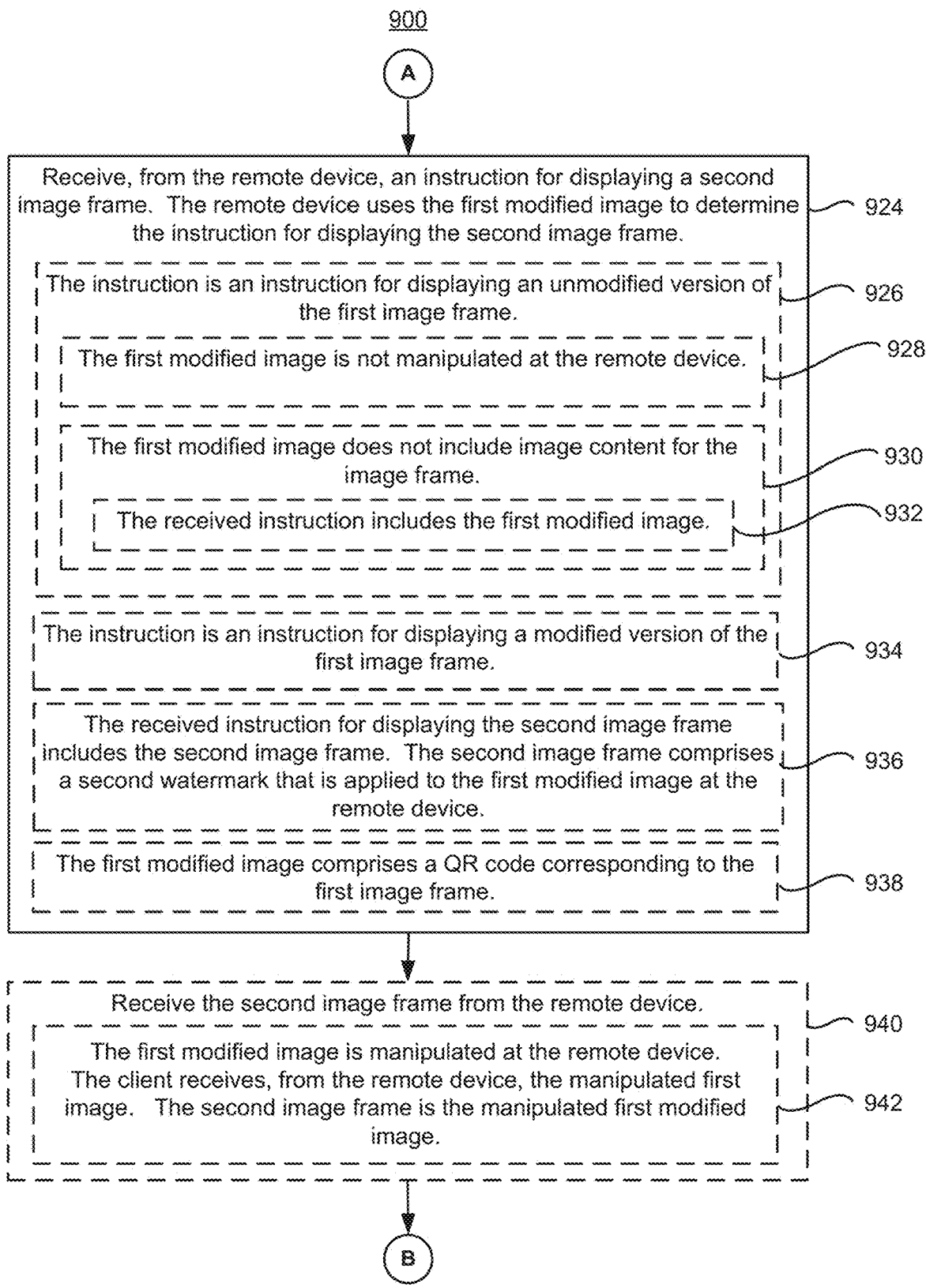
Figure 9C:
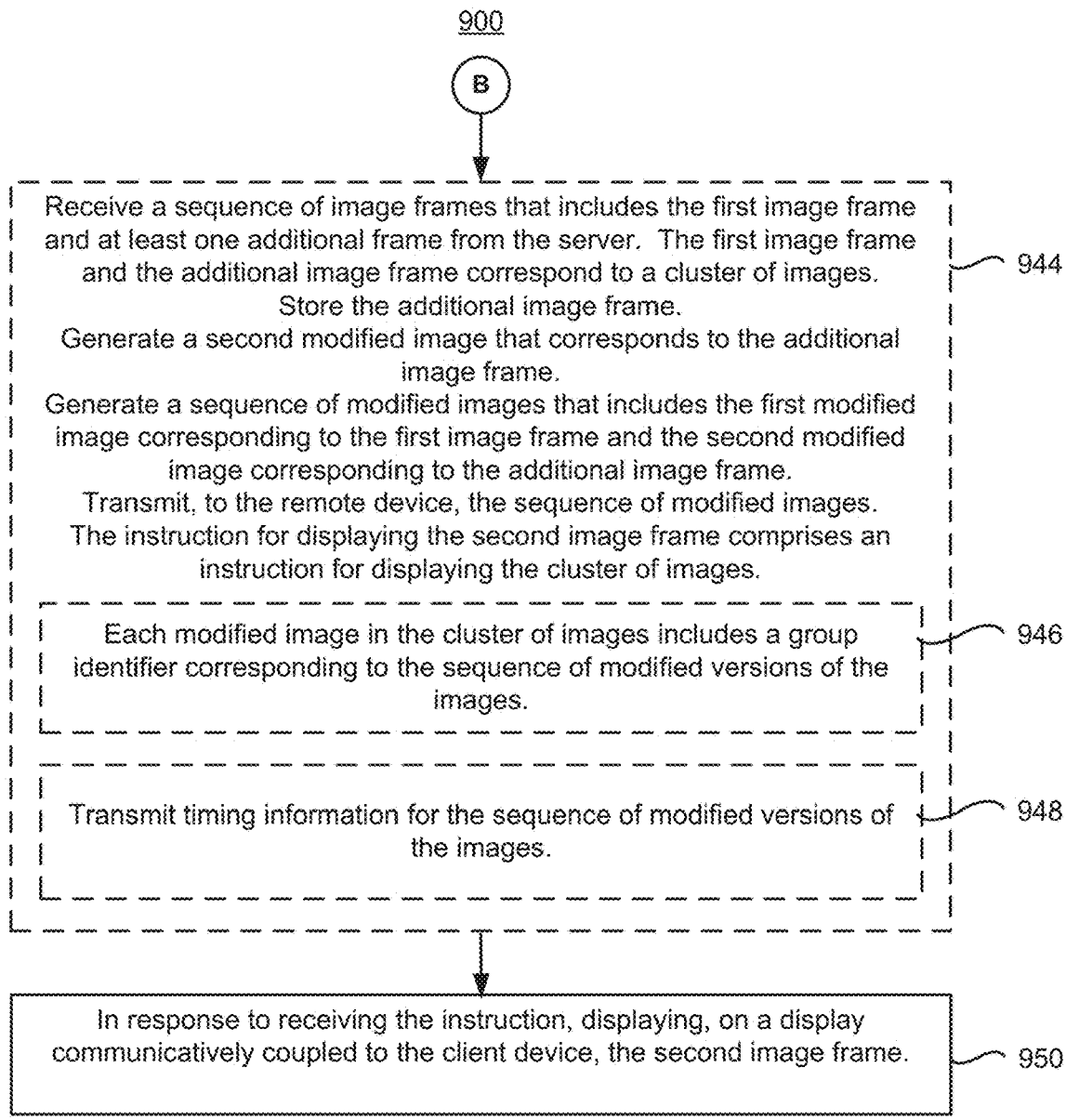

FIGS. 9A-9C illustrate a method 900 performed at a client device (901). For example, instructions for performing the method are stored in the memory 812 and executed by the processor(s) 806 of a client device as described with regard to FIG. 8. Some operations described with regard to the method 900 are, optionally, combined and/or the order of some operations is, optionally, changed. In some embodiments, the client device is configured to utilize (902) the processing resources of a server-based computing environment. For example, a portion of processing (e.g., graphics processing) may be performed at a server remote from the client device. For example, the client device is a thin client. In some embodiments, the client device does not include a hard disk drive. In some embodiments, the client device comprises a graphics processing unit (GPU). In some embodiments, the client device comprises a set-top box connected to the Internet. For example, the client device is a set-top box associated with a cable television network.

In some embodiments, the client device 130 opens (904) a session with a content server. A first image frame is received from the content server. In some embodiments, the client device 130 requests, from the content server, the first image frame (e.g., as described with reference to FIG. 6).

The client device 130 receives (906) a first image frame (e.g., image assets 121) from a server (e.g., CDN 105). In some embodiments, the server comprises (908) a content management device. In some embodiments, the server comprises (910) a content storage device.

The client device 130 stores (912) the first image frame. The client device generates (914) a first modified image (e.g., a modified image 302) that corresponds to the first image frame. In some embodiments, the client is enabled to execute instructions for displaying the first image frame received from CDN 105 (e.g., in response to receiving the first image, the client is enabled to display the first image). In some embodiments, the client device does not display or does not initially display the first image frame received from CDN 105 (e.g., until instructions for displaying a second image are received from a remote device). For example, without displaying the received first image frame, the client device generates the modified image frame and sends the modified image frame to the remote device. In some embodiments, the client device forgoes displaying the first image frame (e.g., the client device instead displays a second image frame as instructed by a remote device).

In some embodiments, the first modified image 302 comprises (916) a first watermark overlaid with the first image frame. In some embodiments, generating the first modified image comprises converting (918) at least a portion of the first image frame to an encoded data set (e.g., a binary data set). In some embodiments, a first row of the image frame is converted to a binary code that is decipherable by the second remote device and/or the client. In some embodiments, the client device 130 determines whether an image will be modified before modifying the image. For example, if the client device determines the image will not be modified at the server, the device applies a QR code 407 (e.g., to a blank image frame as in modified image 408). The client device does not send image data of the unmodified image frame when the image frame is not modified at the server. In some embodiments, the client device defaults to modifying the image such that the image will be modified at the server. For example, if the client device is unsure whether the image frame will be modified at the server, the client device applies a modification to the image and sends the modified image frame with image data for the image such that it can be modified by the server.

Figure 10:
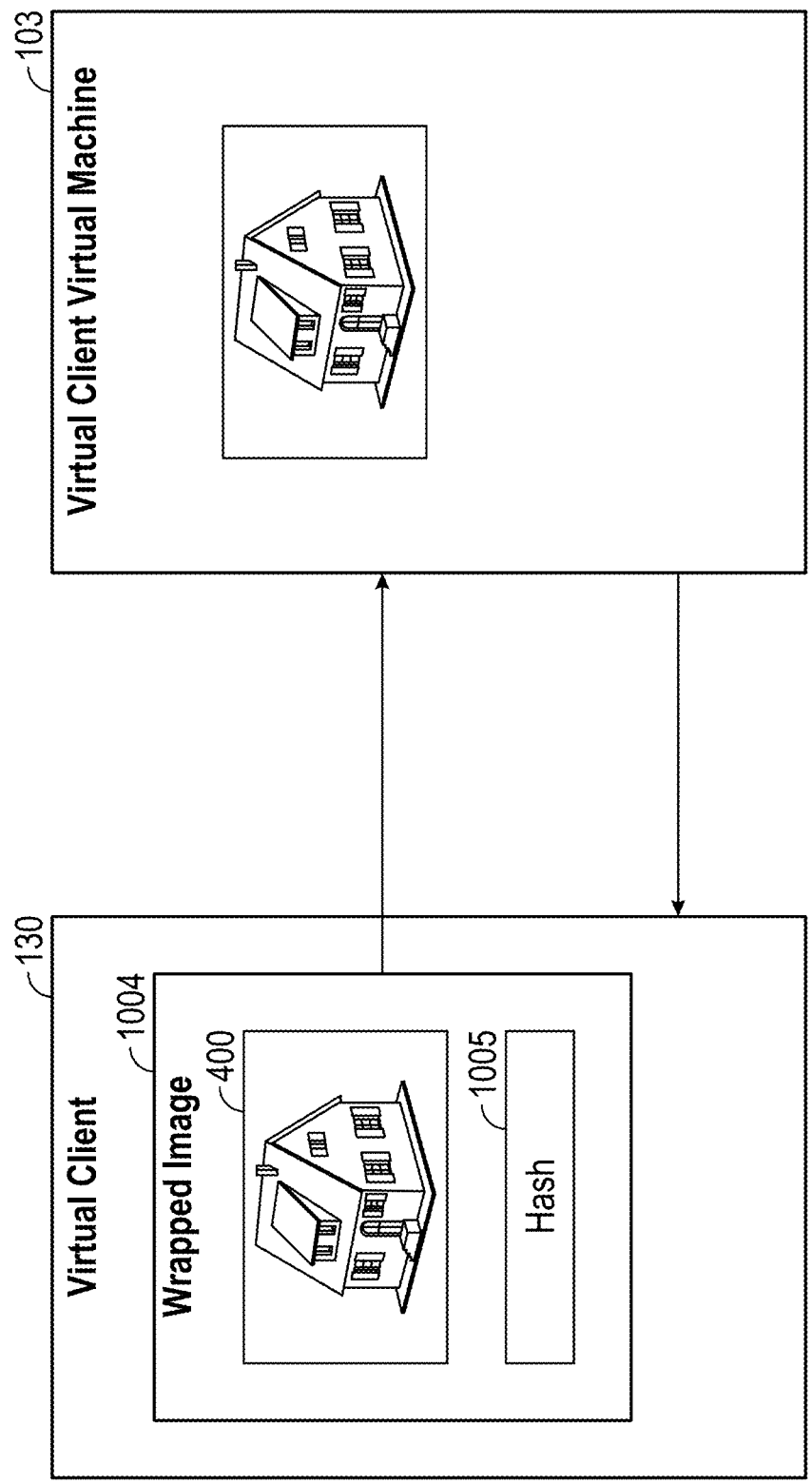
FIG. 10 is a block diagram of a client device sending a wrapped image to a virtual machine.

In some embodiments, the first modified image comprises (920) a first perceptual hash (pHash) of the first image frame 400. For example, the client device generates a hash 1105 (e.g., a pHash) and wraps the hash 1105 with the image frame 400 to create a modified image frame (e.g., to generate wrapped image 1004). In some embodiments, the client device generates a unique identifier instead of (or in addition to) hash 1105 to identify the image frame 400. In some embodiments, the modified image frame includes both the pHash (or unique identifier) and the image 400 (e.g., wrapped together). In some embodiments, generating the pHash includes analyzing the image and/or modifying a color palette of the image. In some embodiments, the client 130 stores (e.g., in a lookup table) the generated hash to identify the first image frame. For example, the hash is a unique identifier of the first image frame. In some embodiments, as shown in FIG. 10, the modified image (e.g., the first image frame and the hash wrapped with the first image frame) is sent to VCVM 103.

The client device transmits (922), to a remote device, the generated first modified image 302. For example, the remote device (e.g., VCVM 103) is running with an application (e.g., third party application 101-3) associated with the provision of content coming from the server. In some embodiments, the application 101-3 is unmodified but routed through the client device. The client device 130 receives (924), from the remote device, an instruction (e.g., instruction 304) for displaying a second image frame. The second remote device uses the first modified image to determine the instruction for displaying the second image frame. In some embodiments, the second image frame is the first image frame. In some embodiments, the client device receives the second image frame from the remote device.

In some embodiments, the instruction is (926) an instruction for displaying an unmodified version of the first image frame (e.g., the first modified image is a QR code). In some embodiments, the first modified image is not (928) manipulated at the remote device. For example, if a QR code is sent from the client device to the remote device in lieu of a watermarked image, and image modification is needed, an instruction is sent from the remote device to the client indicating a manipulation that the client will perform for the image corresponding to the QR code.

In some embodiments, the first modified image does not include (930) image content for the image frame. In some embodiments, the received instruction includes (932) the first modified image. For example, the remote device sends the QR code back to the client so that the client can identify the first image.

In some embodiments, the instruction is (934) an instruction for displaying a modified version of the first image frame. In some embodiments, the received instruction includes the first modified image and the instruction for displaying the second image frame is an instruction for displaying the first modified version of the first image frame. For example, the first modified image 302 includes image content and a watermark. The instruction 304 includes the first modified image sent back to the client device, even though the application 101-3 has not manipulated the first modified image. The client then associates the instruction for displaying the second image frame as an instruction for displaying the first modified image In some embodiments, the received instruction for displaying the second image frame includes (936) the second image frame. The second image frame comprises a second watermark that is applied to the first modified image at the remote device. In some embodiments, the second watermark is the first watermark that is reapplied to the manipulated image at the server. For example, the client cannot match the image directly if the image has been modified at the server. In some embodiments, the server strips the modification (e.g., hash), processes the image, then reapplies the modification and sends the processed image and reapplied modification back to the client. In some embodiments, processing is applied to an image that has the hash applied (e.g., the hash is configured to withstand image modification) without removing the hash. In some embodiments, the client device can do further manipulation of the modified image. In some embodiments, modifying the image comprises flipping the color wheel. In some embodiments, modifying the image comprises changing the image in such a way that cannot be seen or detected by a user.

In some embodiments, the first modified image comprises (938) a QR code corresponding to the first image frame. For example, the modified first image frame acts as a placeholder at the remote device (e.g., virtual set top box) where the remote device provides instructions to the client device on how the client device should process the image frame.

In response to receiving the instruction, the client device displays (950), on a display communicatively coupled to the client device, the second image frame.

In some embodiments, the client device receives (940) the second image frame from the remote device.

In some embodiments, the first modified image is manipulated at the remote device and the client device receives (942), from the second remote device, the manipulated first modified image. The second image frame is the manipulated first modified image. In some embodiments, the second image frame is distinct from the first image frame 302. For example, the second image frame is a manipulated version of the first image frame 302 that has been manipulated at the application 101-3. The client device receives both the instruction for displaying the second image frame and the image frame from the remote device. The client displays the second image frame that includes the manipulations applied at the remote device (e.g., and does not display the first modified image stored at the client).

In some embodiments, the client device receives (944) a sequence of image frames that includes the first image frame and at least one additional frame from the server. The first image frame and the additional image frame correspond to a cluster of images. The client device stores the additional image frame. The client device generates a second modified image (e.g., by wrapping the additional image frame with a second hash, where each image frame in the sequence of image frames is wrapped with its own perceptual hash) that corresponds to the additional image frame. The client device generates a sequence of modified images that includes the first modified image corresponding to the first image frame and the second modified image corresponding to the additional image frame. The client device transmits, to the remote device, the sequence of modified images (e.g., for the remote device to be able to identify the cluster of images). The instruction for displaying the second image frame comprises an instruction for displaying the cluster of images.

In some embodiments, each modified image (e.g., the first modified image and the second modified image) in the cluster of images includes (946) a group identifier corresponding to the sequence of modified versions of the images. In some embodiments, the cluster of images includes a fourth image frame and the sequence of modified images further includes a third modified image corresponding to the fourth image frame.

In some embodiments, the client device, transmits (948), to the remote device, timing information for the sequence of modified versions of the images (e.g., a number of frames, a duration for the image to be displayed, and/or other information included in the hash). In some embodiments, the first modified image comprises a QR code corresponding to the first image frame. For example, the QR code is sent in addition to the image frame as separate data or is imbedded in the first modified image.

In some embodiments, the method 900 is performed by a server computer system 700 as shown in FIG. 7. For example, instructions for performing the method are stored in the memory 706 and executed by the processor(s) 702 of the server computer system 700. Some operations described with regard to the process 900 are, optionally, combined and/or the order of some operations is, optionally, changed.

In some embodiments, a method is performed at a virtual computing device (e.g., server 700). The method comprises, at the virtual computing device, receiving, from a client device, a first image to which a first modification has been applied by the client (e.g., a watermark, such as a QR code, a binary row of encoded data, a pHash wrapped with the image) that corresponds to a first image frame. The method further comprises generating a second image frame based on the received first image to which the first modification has been applied by the client, including removing the modification applied by the client from the received first image. For example, the virtual computing device removes the modification if subsequent manipulation of the first image would change the modification (e.g., such that the client cannot recognize the modification as being associated with the first image). After removing the modification applied by the client from the received first image, the virtual computing device manipulates (e.g., changes size, color, etc.) the received first image. After manipulating the received first image, the virtual computing device applies a second modification (e.g., the same modification or a modification different from the first modification) to the first image to generate the second image frame. The virtual computing device transmits, to the client device, the second image frame for display at the client device. In some embodiments, the client device displays the second image frame.

In some embodiments, a method performed at a virtual computing device (e.g., server 700) is provided. The virtual computing device receives, from a client device, a first image to which a first modification has been applied by the client (e.g., a watermark) that corresponds to a first image frame. The virtual computing device generates an instruction for displaying a second image frame based on the received first image to which the first modification has been applied by the client, including removing the modification applied by the client from the received first image. After removing the modification applied by the client from the received first image, the virtual computing device determines an instruction to manipulate (e.g., change the image size, color, position on screen, etc.) the received first image. After determining the instruction to manipulate the received first image, the virtual computing device applies a second modification (e.g., the same modification or different from the first modification) to the first image to generate a second image frame. In some embodiments, the instruction for displaying the second image frame includes the second image frame. The virtual computing device transmits, to the client device, the instruction for displaying the second image frame at the client device. In some embodiments, the client device applies the received instruction to the second image frame and displays the second image frame accordingly.

In some embodiments, a method for receiving a modified image at a server device is provided. The server computing device receives, from a client device, a modified version of an image (e.g., a QR code without image data) that corresponds to a first image frame. The first modified image does not include image data of the first image frame. The server device generates an instruction, based on the first modified image, for displaying the first image frame at the client device. The server device transmits, to the client device, the generated instruction for displaying the first image frame at the client device. The generated instruction does not include the first modified image.

In some embodiments, a method performed at a client device is provided. The method includes receiving a first image frame (e.g., image frame 1102) from a server and storing the first image frame. The method further includes generating a first image tag (e.g., hash) that identifies the first image frame. The method includes storing the first image tag that identifies the first image frame (e.g., in a hash table 1101 at the client device). The method includes transmitting, to a remote device, the first image frame. The method includes receiving, from the remote device, an instruction for displaying a second image frame, the instruction including a second image tag that identifies the second image frame (e.g., image frame 1104). The method further includes performing a lookup (e.g., in the hash table at the client 130) to match the second image tag with the first image tag. The method includes, in response to identifying a match between the received second image tag and the first image tag, displaying, on a display communicatively coupled to the client device, the second image frame (e.g., an unmodified version of the first image frame or a modified version of the first image frame (e.g., modified based on the instructions for displaying the second image frame)).

Figure 11:
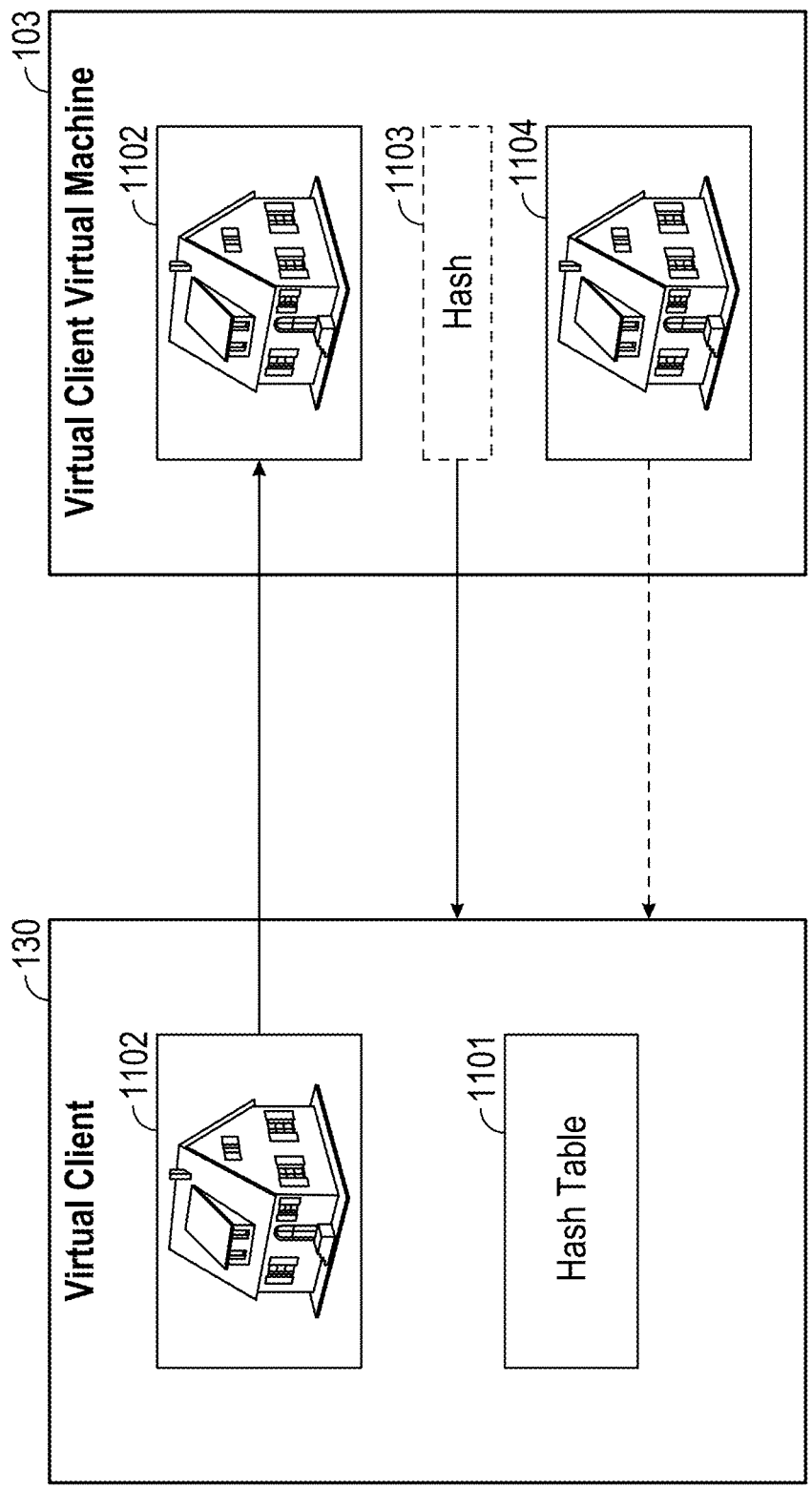
FIG. 11 is a block diagram of a client device receiving a hash from a virtual machine.

FIG. 11 illustrates virtual client 130 transmitting a first image frame 1102 to the VCVM 103. In some embodiments, the first image frame 1102 is an unmodified image frame. In some embodiments, the first image frame 1102 is a forwarded image asset received from 3rd party CDN 105 (e.g., without modification). In some embodiments, virtual client 130 does not transmit a hash (e.g., a pHash) identifying the image frame 1102. In some embodiments, virtual client 130 includes a hash table 1101 for storing identification of the image frame 1102 (e.g., based on a hash tagging the image frame). In some embodiments, VCVM 103 receives the unmodified image frame 1102 (without a hash). In some embodiments, VCVM 103 generates a hash 1103 tagging the received image frame 1102. In some embodiments, VCVM 103 stores the hash 103 tagging the received image frame in a hash table (e.g., stored at VCVM 103).

In some embodiments, the image frame 1102 is not modified by VCVM 103 and the hash 1103 that tags the image is sent to virtual client 130 (e.g., without sending the image 1102 back to the virtual client). In some embodiments, VCVM 103 sends the hash 1103 generated at VCVM 103 without sending the image frame 1102 to client 130 (e.g., to reduce bandwidth by not transmitting the image frame 1102). For example, virtual client 130 is enabled to identify the image 1102 (that is already stored at virtual client 130) based on the hash 1103 received from VCVM 103. There is no need for VCVM 103 to send the unmodified image 1102 back to the client 130. In some embodiments, virtual client 130 performs a lookup (e.g., in hash table 1101) to match the hash 1103 received from VCVM 103 to a hash generated at the virtual client 130.

In some embodiments, VCVM 103 sends an instruction for modifying the image 1102 (e.g., and sends the hash 1103 to identify the image 1102). For example, VCVM 103 does not perform the modification of the image 1102 and sends an instruction for client device 130 to modify the image 1102. The client device 130 is enabled to identify which image the instruction refers to (e.g., based on the hash 1103 received from VCVM 103 with the instruction) and perform the modification on the image 1102.

In some embodiments, the image frame 1102 is modified (e.g., in shape, size, color, etc.) at VCVM 103 to generate the image frame 1104. VCVM 103 sends the image frame 1104 and the hash 1103 of the unmodified image frame 1102 to the virtual client 130. The client 130 is enabled to identify that the received modified image frame 1104 corresponds to the image 1102 (e.g., which is already stored at the virtual client 130) based on the hash 1103, which tags the image frame 1102. For example, the client 130 performs a lookup between the hash 1103 received from VCVM 103 and the hash(es) stored in hash table 1101 at the virtual client 130 to identify a match (indicating that the received image 1104 corresponds to a modified version of the original image 1102). The client device is capable of substituting the modified image frame 1104 for the original image 1102 when executing instructions for displaying the image 1104 to the user. In some embodiments, VCVM 103 transmits the hash 1103 and an image frame 1102 to the client 130 when the image frame 1102 has not been modified.

In summary, a previously unavailable Internet-wide integration that unites operator-provided virtual application services with third-party application services is provided. In some embodiments, services from both managed and unmanaged networks are combined, providing optimized video services to virtually any network connected device. The result is a smooth and responsive interactive and on-demand service from virtually any source to virtually any networked media device, even including legacy cable television installations.

Features of the present invention can be implemented in, using, or with the assistance of a computer program product, such as a storage medium (media) or computer readable storage medium (media) having instructions stored thereon/ in which can be used to program a processing system to perform any of the features presented herein. The storage medium (e.g., the memory 706 and the memory 812) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 706 and the memory 812 include one or more storage devices remotely located from the CPU(s) 702 and 806. The memory 706 and the memory 812, or alternatively the non-volatile memory device(s) within these memories, comprises a non-transitory computer readable storage medium.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
at a computing device:
receiving a modified first image frame corresponding to a first image frame from a client device, the client device storing the first image frame;
generating a second image frame that corresponds to the modified first image frame with a watermark;
transmitting, to a third-party application executing at the computing device, the second image frame;
generating an instruction for modifying the first image frame, the instruction based on an altered version of the second image frame that is identified by the watermark, the second image frame altered by the third-party application; and
transmitting, to the client device, the instruction for modifying the first image frame, wherein, in response to the instruction for modifying the first image frame, the client device displays the first image frame with a modification that corresponds to the altered version of the second image frame as altered by the third-party application.

2. The method of claim 1, wherein the instruction for modifying the first image frame comprises an instruction to change a size of the first image frame.

3. The method of claim 1, wherein the instruction for modifying the first image frame comprises an instruction to change a location of display of the first image frame.

4. The method of claim 1, wherein the modified first image frame does not include image content for the first image frame.

5. The method of claim 1, wherein the modified first image frame corresponds to an image frame, received by the client device, from a content distribution network (CDN).

6. The method of claim 1, wherein the second image frame comprises the watermark overlaid with the modified first image frame.

7. The method of claim 1, wherein the instruction for modifying the first image frame is transmitted to the client device without transmitting the modified first image frame.

8. A non-transitory computer readable storage medium storing one or more programs for execution by one or more processors of a computing device, the one or more programs including instructions for:
  receiving a modified first image frame corresponding to a first image frame from a client device, the client device storing the first image frame;
  generating a second image frame that corresponds to the modified first image frame with a watermark;
  transmitting, to a third-party application executing at the computing device, the second image frame;
  generating an instruction for modifying the first image frame, the instruction based on an altered version of the second image frame that is identified by the watermark, the second image frame altered by the third-party application; and
  transmitting, to the client device, the instruction for modifying the first image frame wherein, in response to the instruction for modifying the first image frame, the client device displays the first image frame with a modification that corresponds to the altered version of the second image frame as altered by the third-party application.

9. The non-transitory computer readable storage medium of claim 8, wherein the instruction for modifying the first image frame comprises an instruction to change a location of display of the first image frame.

10. The non-transitory computer readable storage medium of claim 8, wherein the modified first image frame does not include image content for the image frame.

11. The non-transitory computer readable storage medium of claim 8, wherein the modified first image frame corresponds to an image frame, received by the client device, from a content distribution network (CDN).

12. The non-transitory computer readable storage medium of claim 8, wherein the second image frame comprises the watermark overlaid with the modified first image frame.

13. The non-transitory computer readable storage medium of claim 8, wherein the instruction for modifying the first image frame is transmitted to the client device without transmitting the modified first image frame.

14. A server comprising:
  one or more processors; and
  memory storing one or more programs for execution by the one or more processors, the one or more programs including instructions for:
    receiving a modified first image frame corresponding to a first image frame from a client device, the client device storing the first image frame;
    generating a second image frame that corresponds to the modified first image frame with a watermark;
    transmitting, to a third-party application executing at the server, the second image frame;
    generating an instruction for modifying the first image frame, the instruction based on an altered version of the second image frame that is identified by the watermark, the second image frame altered by the third-party application; and
    transmitting, to the client device, the instruction for modifying the first image frame, wherein, in response to the instruction for modifying the first image frame, the client device displays the first image frame with a modification that corresponds to the altered version of the second image frame as altered by the third-party application.

15. The server of claim 14, wherein the instruction for modifying the first image frame comprises an instruction to change a size of the first image frame.

16. The server of claim 14, wherein the instruction for modifying the first image frame comprises an instruction to change a location of display of the first image frame.

17. The server of claim 14, wherein the modified first image frame does not include image content for the first image frame.

18. The server of claim 14, wherein the modified first image frame corresponds to an image frame, received by the client device, from a content distribution network (CDN).

19. The server of claim 14, wherein the second image frame comprises the watermark overlaid with the modified first image frame.

20. The server of claim 14, wherein the instruction for modifying the first image frame is transmitted to the client device without transmitting the modified first image frame.

* * * * *